United States Patent (10) Patent No.: US 8,185,216 B2
Sekiai et al. (45) Date of Patent: May 22, 2012

(54) PLANT CONTROLLING DEVICE AND METHOD, THERMAL POWER PLANT, AND ITS CONTROL METHOD

(75) Inventors: Takaaki Sekiai, Hitachi (JP); Satoru Shimizu, Hitachi (JP); Akihiro Yamada, Tokai (JP)

(73) Assignee: Hitachi, Ltd., Tokyo (JP)

( * ) Notice: Subject to any disclaimer, the term of this patent is extended or adjusted under 35 U.S.C. 154(b) by 759 days.

(21) Appl. No.: 12/279,348

(22) PCT Filed: Dec. 27, 2006

(86) PCT No.: PCT/JP2006/326111
§ 371 (c)(1),
(2), (4) Date: Aug. 14, 2008

(87) PCT Pub. No.: WO2007/102269
PCT Pub. Date: Sep. 13, 2007

(65) Prior Publication Data
US 2009/0099667 A1 Apr. 16, 2009

(30) Foreign Application Priority Data

Mar. 8, 2006 (JP) .................................. 2006-062619

(51) Int. Cl.
*G05B 13/02* (2006.01)
(52) U.S. Cl. ............................... 700/29; 700/33; 700/47
(58) Field of Classification Search ............. 700/29–33, 700/44, 47–50, 297; 110/185, 203, 345
See application file for complete search history.

(56) References Cited

U.S. PATENT DOCUMENTS

| 5,305,230 A | 4/1994 | Matsumoto et al. |
| 5,971,747 A | 10/1999 | Lemelson et al. |
| 5,993,194 A | 11/1999 | Lemelson et al. |
| 6,227,842 B1 | 5/2001 | Lemelson et al. |

(Continued)

FOREIGN PATENT DOCUMENTS

JP 03-164804 7/1991

(Continued)

OTHER PUBLICATIONS

International Preliminary Report and Written Opinion; International Application No. PCT/JP2006/326111; International Filing Date: Dec. 27, 2006.

(Continued)

*Primary Examiner* — Kakali Chaki
*Assistant Examiner* — Nathan Laughlin
(74) *Attorney, Agent, or Firm* — Antonelli, Terry, Stout & Kraus, LLP.

(57) ABSTRACT

A controlling device that includes a model that predicts the value of a measured signal obtained when an operation signal is given to a thermal power generation plant, a function that learns a method of generating a model input such that a model output satisfies the plant value, a function that determines an operation signal to be given to the plant according to the learning result, a database that stores measured signal limit values set in advance, an external input interface that fetches measured signals from the plant, a measured signal database that stores the values of the fetched measured signals, and a function that determines an initial value of the plant model output value by using limit values of the measured signals and at least one of an average value, a maximum value, and a minimum value that are calculated from the measured signals stored in a measured signal database.

17 Claims, 18 Drawing Sheets

U.S. PATENT DOCUMENTS

| | | |
|---|---|---|
| 6,468,069 B2 | 10/2002 | Lemelson et al. |
| 2007/0156288 A1* | 7/2007 | Wroblewski et al. ......... 700/266 |
| 2007/0240648 A1* | 10/2007 | Badami et al. ................ 122/504 |

FOREIGN PATENT DOCUMENTS

| | | |
|---|---|---|
| JP | 08-339204 | 12/1996 |
| JP | 11-053005 | 2/1999 |
| JP | 11-073207 | 3/1999 |
| JP | 2000-222005 | 8/2000 |
| JP | 2004-126868 | 4/2004 |
| JP | 2005-249349 | 9/2005 |

OTHER PUBLICATIONS

Sutton et al., "Reinforcement Learning: An Introduction", Dec. 20, 2000, p. 142-172, p. 247-253. Translated by Sadayoshi Mikami and Masaaki Minagawa, Kitagawa Shuppan Kabushigaisha.

* cited by examiner

TO CHIMNEY AFTER EXHAUST GAS PROCESSING

FIG. 4

| DATE AND TIME | $F_{150}$ | $T_{151}$ | $P_{152}$ | $E_{153}$ | $D_{154}$ | ... |
|---|---|---|---|---|---|---|
| YEAR, MONTH, DAY HOURS:MINUTES:SECONDS | Kg/s | °C | Mpa | MW | ppm | ... |
| 2005/01/01 12:00:00 | 300 | 580 | 18.5 | 450 | 100 | ... |
| 2005/01/01 12:00:01 | 300 | 579 | 18.5 | 450 | 100 | ... |
| 2005/01/01 12:00:02 | 300 | 579 | 18.5 | 450 | 98 | ... |
| ... | ... | ... | ... | ... | ... | ... |

FIG. 5

| DATE AND TIME | FEED WATER FLOW RATE | FUEL FLOW RATE | TURBINE GOVERNOR OPENING | AIR FLOW RATE | DAMPER OPENING | ... |
|---|---|---|---|---|---|---|
| YEAR, MONTH, DAY HOURS:MINUTES:SECONDS | Kg/s | Kg/s | % | Kg/s | % | ... |
| 2004/01/01 12:00:00 | 400 | 40 | 85 | 450 | 50 | ... |
| 2004/01/01 12:00:01 | 400 | 40 | 86 | 450 | 50 | ... |
| 2004/01/01 12:00:02 | 400 | 41 | 86 | 450 | 50 | ... |
| ... | ... | ... | ... | ... | ... | ... |

| STATE NUMBER | INPUT SIGNAL A | | INPUT SIGNAL B | | ... |
|---|---|---|---|---|---|
| | LOWER LIMIT | UPPER LIMIT | LOWER LIMIT | UPPER LIMIT | ... |
| 001 | ☐ | ☐ | ☐ | ☐ | ... |
| 002 | ☐ | ☐ | ☐ | ☐ | ... |
| 003 | ☐ | ☐ | ☐ | ☐ | ... |
| 004 | ☐ | ☐ | ☐ | ☐ | ... |
| 005 | ☐ | ☐ | ☐ | ☐ | ... |
| ... | ... | ... | ... | ... | ... |

FIG. 12

| STATE NUMBER | CONTROL UNIT | | EVALUATION UNIT |
|---|---|---|---|
| | CENTER | DISPERSION | |
| 001 | ☐ | ☐ | ☐ |
| 002 | ☐ | ☐ | ☐ |
| 003 | ☐ | ☐ | ☐ |
| 004 | ☐ | ☐ | ☐ |
| 005 | ☐ | ☐ | ☐ |
| ... | ... | ... | ... |

FIG. 13

| NAME | PARAMETER |
|---|---|
| CONTROL UNIT LEARNING RATE 1 | ☐ |
| CONTROL UNIT LEARNING RATE 1 | ☐ |
| EVALUATION UNIT LEARNING RATE | ☐ |
| DISCOUNT RATE | ☐ |
| ... | ... |

FIG. 14

| NAME | LIMIT VALUE | REQUIREMENT | TARGET VALUE |
|---|---|---|---|
|  | ☐ (°C) |  | ☐ (°C) |
|  | ☐ (MPa) |  | ☐ (MPa) |
|  | ☐ (ppm) |  | ☐ (ppm) |
|  | ☐ (ppm) |  | ☐ (ppm) |
|  | ☐ ( ) |  | ☐ ( ) |

| | |
|---|---|
| EVALUATION VALUE 1 | ☐ |
| EVALUATION VALUE 2 | ☐ |
| ... | ☐ |

FIG. 20

SET LEARNING CONDITIONS

CONTROLLED AMOUNTS 971

| NAME | LIMIT VALUE | REQUEST |
|---|---|---|
| ▼ | ▢ (°C) | A ▼ |
| ▼ | ▢ (MPa) | A ▼ |
| ▼ | ▢ (ppm) | A ▼ |
| ▼ | ▢ (ppm) | B ▼ |
| ▼ | ▢ ( ) | ▼ |

PARAMETERS 972

| NAME | DESIGNED VALUE |
|---|---|
| CONTROL UNIT LEARNING RATE 1 | ▢ |
| CONTROL UNIT LEARNING RATE 1 | ▢ |
| EVALUATION UNIT LEARNING RATE | ▢ |
| DISCOUNT RATE | ▢ |
| SAMPLING FREQUENCY | ▢ |

OPERATION END 973

| NAME | RANGE | | NUMBER OF DIVISIONS |
|---|---|---|---|
| | LOWER LIMIT | UPPER LIMIT | |
| ▼ | ▢ | ▢ (kg/s) | ▢ |
| ▼ | ▢ | ▢ (%) | ▢ |
| ▼ | ▢ | ▢ (%) | ▢ |
| ▼ | ▢ | ▢ (%) | ▢ |
| ▼ | ▢ | ▢ (%) | ▢ |

SAVE 974    CANCEL 975    RETURN 976

PLANT CONTROLLING DEVICE AND METHOD, THERMAL POWER PLANT, AND ITS CONTROL METHOD

TECHNICAL FIELD

The present invention relates to a plant controlling device and method, and also relates to a thermal power plant and thermal power plant control method.

BACKGROUND ART

A plant controlling device processes measured signals obtained from a plant, which is a control target, and calculates operation signals to be given to the plant. The plant controller includes an algorithm for calculating the operation signals so that the measured signal from the plant satisfies an operation target.

Control algorithms used for plant control include a proportional integration (PI) control algorithm. To derive an operation signal, this algorithm multiplies a deviation between a target operation value and a measured signal by a proportional gain, and adds a value obtained by integrating the deviation with time to the value obtained by the multiplication. It is also known that a learning algorithm is used to derive a plant operation signal.

A technique called reinforcement learning has been available in recent years in a field of learning without teachers. Reinforcement learning is known as a framework of learning controls in which a method of generating operation signals to be given to a control target is learned through trial-and-error interaction to and from a control target so that desirable measured signals are obtained from the control target.

In reinforcement learning, a value obtained by evaluating a scalar value that is calculated by using a signal obtained from the control target (the evaluated value is called "compensation" in reinforcement learning) is used to learn an operation signal generation method so that an expected value of the evaluated value obtained at present and in the future is maximized.

Non-patent Document 1 describes a technique in which a positive evaluated value is given when a measured signal satisfies a target operation value and an operation signal generation method is learned by using Actor-Critic, Q learning, real-time Dynamic Programming, or another algorithm. A framework called the Dyna architecture is also introduced as a method developed from the technique. The framework has a model that simulates a control target in a controller. The model fetches an operation signal to be given to the control target as a model input, and calculates a model output, which is a predicted value of a measured signal of the control target. This model is structured by using physical expressions and a statistical technique. An evaluated value calculated from the model output is used to learn a method of generating a model input.

In the Dyna architecture, the model input generation method is learned in advance so that a target model output value is attained, and an operation signal to be applied to a control target is determined from a learning result.

Non-patent Document 1: Reinforcement Learning, translated by Sadayoshi Mikami and Masaaki Minagawa, Kitagawa Shuppan Kabushigaisha, Dec. 20, 2000, p. 142-172, p. 247-253

DISCLOSURE OF THE INVENTION

Problem to be Solved by the Invention

To design the plant controlling device described above, it is necessary to appropriately set a target operation value and target model output value. In particular, to determine the target model output value, a problem described below must be addressed.

The above model output may be an averaged value of measured signals from the control target. Suppose that the same value is set as the target operation value and the model output value. Then, even when an operation signal generated according to a model input that satisfies the target model output value is given to the control target, a measured signal may not satisfy the target operation value. When the control target is operated under a condition in which the operation signal is fixed, measured signals obtained during the operation may vary. If this happens, even when the average of the measured signals is equal to or less than the target operation value, the target operation value may be exceeded in a certain period of time. In this case, even when the model output satisfies the target operation value, the measured signal does not satisfy the target operation value. To have the measured signal satisfy the target operation value, therefore, the target model output value must be determined with measured signal variations taken into consideration.

An object of the present invention is to provide a plant controlling device having functions that can calculate a target operation value by which the above problem is addressed and also provide a plant control method.

Means for Solving the Problem

In the present invention, a plant controlling device having an operation signal generator for generating operation signals to be given to a plant, which is a control target, the plant controller comprising: a model for predicting the value of a measured signal obtained when an operation signal is given to the control target, a target model output value determining device for determining a target model output value by using the measured signal obtained from the control target and a measured signal limit value set in advance, and a learning device for learning a method of generating a model input so that a model output, which is a prediction result yielded by the model, satisfies the target model output value, wherein the operation signal generating device generates an operation signal with reference to a database that stores results of the learning of the method of generating a model input that satisfies the target model output value.

Advantages of the Invention

The plant controlling device according to the present invention has a function that determines a target model output value by using a measured signal from a plant and a measured signal limit value set in advance. When this function is used, measured signals can be processed to derive an average, maximum value, and minimum value.

If the measured signals vary, the target model output value may be a value obtained by subtracting the average of the measured signals from their maximum value and further subtracting the absolute value of the subtraction result from the measured signal limit value.

When the operation signal to be given to the plant, which is the control target, is determined according to the model input generation method by which this target model output value is attained, a match is found between the target model output value and the average of the measured signals. Accordingly, even if the measured signals vary, they do not exceed the measured signal limit value.

Even if measured values vary, when the plant controller in the present invention gives an operation signal to the plant, the measured signals that exceed a limit can be suppressed.

BRIEF DESCRIPTION OF DRAWINGS

FIG. 4 is a map of the data stored in a measured signal database in the controller in the embodiment of the present invention.

FIG. 5 is a map of the data stored in an operation signal database in the controller in the embodiment of the present invention.

FIG. 12 illustrates another example of the data stored in the learning information database in the controller in the embodiment of the present invention.

FIG. 13 is a map of the data stored in a learning parameter database in the controller in the embodiment of the present invention.

FIG. 14 is a map of the data stored in an evaluation value calculating parameter database in the controller in the embodiment of the present invention.

FIG. 20 illustrates a Set learning conditions screen on the image display unit in the embodiment of the present invention.

LEGEND

Figure 1:
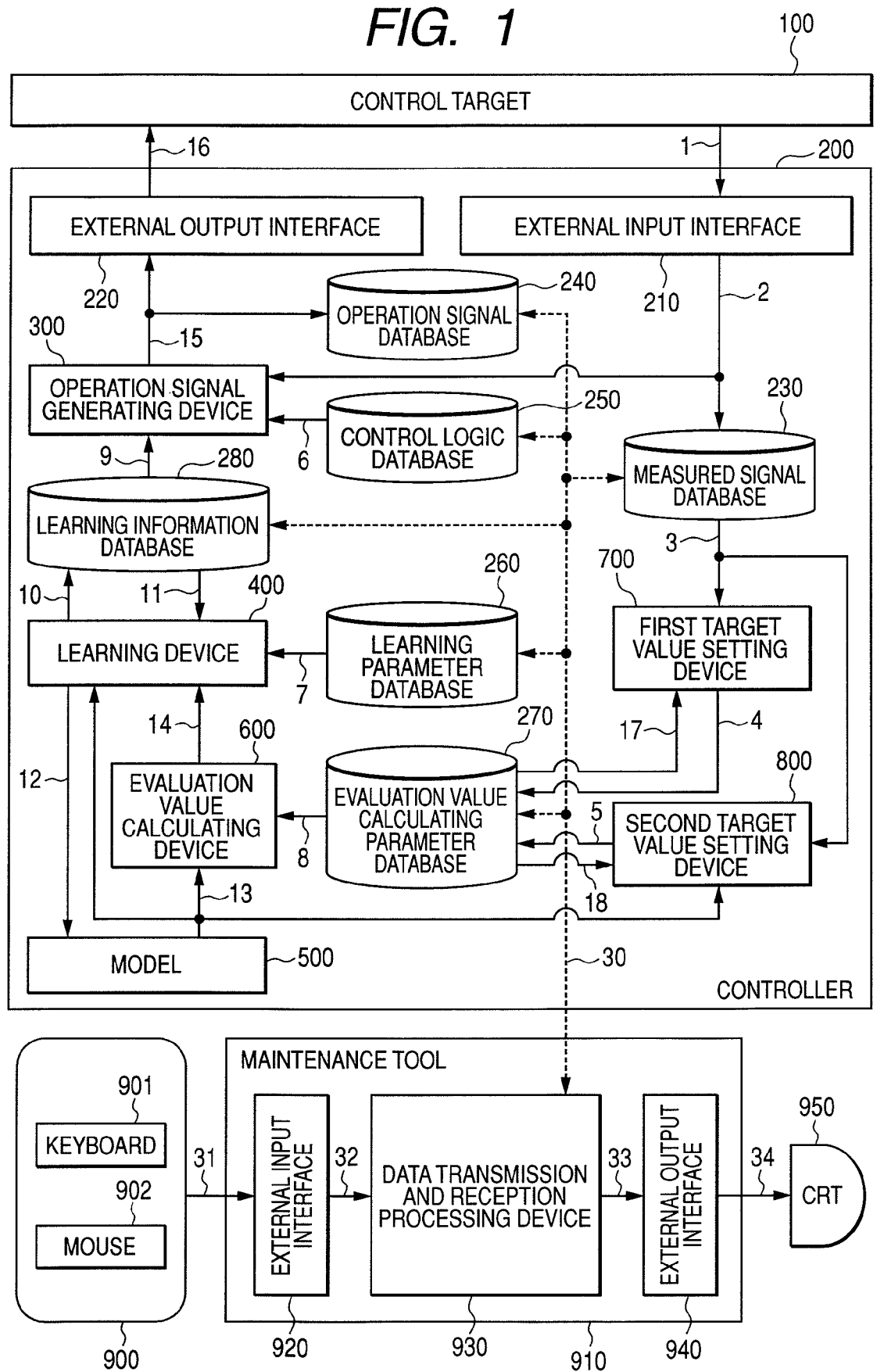
FIG. 1 is a block diagram indicating the structure of a control system in which a controller in an embodiment of the present invention is applied to a control target.

100—control target, 200—controller, 210—external input interface, 220—external output interface, 230—measured signal database, 240—operation signal database, 250—control logic database, 260—learning parameter database, 270—evaluation value calculating parameter database, 280—learning information database, 300—operation signal generating device, 400—learning device, 500—model, 600—evaluation value calculating device, 700—first target value setting device, 800—second target value setting device, 900—input unit, 901—keyboard, 902—mouse, 910—maintenance tool, 920—external input interface, 930—data transmission and reception processing device, 940—external output interface, 950—image display unit

BEST MODE FOR CARRYING OUT THE INVENTION

The present invention further proposes aspects described below.

(1) A plant controlling device for generating an operation signal so that the value of a measured signal satisfies a target operation value for a plant, which is a control target, the measured signal being obtained when the operation signal is given to the control target, the plant controlling device comprising: a model for predicting the value of a measured signal obtained when an operation signal is given to the control target, a learning function for learning a method of generating a model input to be given to the model so that a model output, which is a prediction result yielded by the model, satisfies a target model output value, and a function for determining an operation signal to be given to the control target according to a result of the learning, the plant controlling device further comprising: a database for storing measured signal limit values set in advance, an external input interface for fetching measured signals from the control target, a measured signal database for storing the values of the fetched measured signals, and a function for determining the target model output value by using the measured signal limit value and at least one of an average, a maximum value, and a minimum value that are calculated from the measured signals stored in the measured signal database; the plant controller performs learning by using the learning function so as to attain the determined target value.

(2) In the plant controlling device described in (1) above, wherein the function for determining the target model output value subtracts the average of the measured signals from their maximum value and further subtracts the absolute value of the subtraction result from the measured signal limit value to determine the target model output value.

(3) The plant controlling device described in (1) above, further comprising an evaluated value calculating device for calculating an evaluated value used for the learning; when the target model output value is attained, the evaluated value calculating device yields a positive or negative evaluated value; the learning function learns an operation method in which an expected value of the evaluated value is maximized or minimized.

(4) The plant controlling device described in (1) above, further comprising a user interface for accepting the measured signal limit values.

(5) In a plant controlling device having an operation signal generator for generating an operation signal to be given to a plant, which is a control target, the plant controlling device comprising: a model for predicting the value of a measured signal obtained when an operation signal is given to the control target, a learning device for learning a method of generating a model input so that a model output, which is a prediction result yielded by the model, satisfies a target model output value, a target model output value determining device for determining an initial value of a target model output value by using the measured signal obtained from the control target and a measured signal limit value, which is set in advance, and a target model value changing device for increasing or decreasing the target model output value; wherein the target model value changing device is first used to learn the method of generating a model input so as to attain an initial value of the target model output value, and then the operation signal generation device generates an operation signal with reference to a database that stores results obtained by learning of the method of generating a model input to attain the increased or decreased target model output value.

(6) A plant controlling device for generating an operation signal so that the value of a measured signal satisfies a target operation value for a plant, which is a control target, the measured signal being obtained when the operation signal is given to the control target, the plant controlling device comprising: a model for predicting the value of a measured signal obtained when an operation signal is given to the control target, a learning function for learning a method of generating a model input to be given to the model so that a model output, which is a prediction result yielded by the model, satisfies a target model output value, and a function for determining an operation signal to be given to the control target according to a result of the learning, the plant controlling device further comprising: a database for storing measured signal limit values set in advance, an external input interface for fetching measured signals from the control target, a measured signal database for storing the values of the fetched measured signals, a function for determining an initial value of the target model output value by using the measured signal limit value and at least one of an average, a maximum value, and a minimum value that are calculated from the measured signals stored in the measured signal database, and a function for decreasing or increasing the target model output value when the model output satisfies the target model output value; wherein the learning function is used for learning so as to attain the initial value and the increased or decreased target model output value.

(7) The plant controlling device described in (6) above, wherein the function for determining the initial value of the target model output value subtracts the average of the measured signals from the maximum value of the measured signals and further subtracts the absolute value of the subtraction result from the measured signal limit value to determine the target model output value.

(8) The plant controlling device described in (6) above, further comprising an evaluated value calculating device for calculating an evaluated value used for the learning; wherein when the target model output value is attained, the evaluated value calculating device yields a positive or negative evaluated value; the learning function learns an operation method in which an expected value of the evaluated value is maximized or minimized.

(9) The plant controlling device described in (6) above, further comprising a user interface for accepting the measured signal limit values.

(10) A thermal power plant having a controlling device for generating an operation signal so that the value of a measured signal satisfies a target operation value for a thermal power generation plant, which is a control target, the measured signal being obtained when the operation signal is given to the control target, the controlling device comprising: a model for predicting the value of a measured signal obtained when an operation signal is given to the control target; a learning function for learning a method of generating a model input to be given to the model so that a model output, which is a prediction result yielded by the model, satisfies a target model output value; a function for determining an operation signal to be given to the control target according to a result of the learning; a database for storing measured signal limit values set in advance; an external input interface for fetching measured signals from the control target; a measured signal database for storing the values of the fetched measured signals; and a function for determining an initial value of the target model output value by using limit values for the measured signals and at least one of an average, a maximum value, and a minimum value that are calculated from the measured signals stored in the measured signal database; wherein the external input interface fetches at least one of a carbon monoxide concentration and a nitrogen oxide concentration out of measured signals in a thermal power generation plant; an environment limit value of at least one of the carbon monoxide concentration and a nitrogen oxide concentration is stored in the database for storing the limit values for the measured signals as the measured signal limit value; the function for determining an initial value of the target model output value determines an initial value of the target model output value of the at least one of the carbon monoxide concentration and the nitrogen oxide concentration; the learning function learns a method of generating a model input that satisfies the initial value; the function for determining an operation signal generates an operation signal for at least an opening of an air damper according to a result of the learning.

(11) A thermal power plant controlling device for generating an operation signal so that the value of a measured signal satisfies a target operation value for a thermal power generation plant, which is a control target, the measured signal being obtained when the operation signal is given to the control target, the controlling device comprising: a model for predicting the value of a measured signal obtained when an operation signal is given to the control target; a learning function for learning a method of generating a model input to be given to the model so that a model output, which is a prediction result yielded by the model, satisfies a target model output value; a function for determining an operation signal to be given to the control target according to a result of the learning; a database for storing measured signal limit values set in advance; an external input interface for fetching measured signals from the control target; a measured signal database for storing the values of the fetched measured signals; a function for determining an initial value of the target model output value by using the measured signal limit value and at least one of an average, a maximum value, and a minimum value that are calculated from the measured signals stored in the measured signal database; and a function for decreasing or increasing the target model output value when the model output satisfies the target model output value;

wherein the external input interface fetches at least one of a carbon monoxide concentration and a nitrogen oxide concentration out of measured signals in a thermal power generation plant; an environment limit value of the at least one of the carbon monoxide concentration and the nitrogen oxide concentration is stored in the database for storing the limit values for the measured signals as the measured signal limit value; the function for determining an initial value of the target model output value determines an initial value of the target model output value of the at least one of the carbon monoxide concentration and the nitrogen oxide concentration, the learning function learns a method of generating a model input that satisfies the initial value; the function for decreasing or increasing the target model output value when the model output satisfies the target model output value determines a modified target model output value obtained by decreasing or increasing the target model output value of the nitrogen oxide; the learning function learns a method of generating a model input that satisfies the modified target model output value; the function for determining an operation signal generates an operation signal for at least an opening of an air damper according to a result of the learning.

(12) A plant control method for generating an operation signal so that the value of a measured signal satisfies a target operation value for a plant, which is a control target, the measured signal being obtained when the operation signal is given to the control target comprising steps of; predicting the value of a measured signal obtained when an operation signal is given to the control target by using a model, learning a method of generating a model input to be given to the model so that a model output, which is a prediction result yielded by the model, satisfies a target model output value, and determining an operation signal to be given to the control target according to a result of the learning, further comprising steps of:

determining a target model output value by using at least one of an average, a maximum value, and a minimum value of measured signals of the control target as well as a measured signal limit value set in advance; and learning a method of generating a model input to be given to the model so that the target value is attained.

(13) A plant control method for generating an operation signal so that the value of a measured signal satisfies a target operation value for a plant, which is a control target, the measured signal being obtained when the operation signal is given to the control target comprising steps of; predicting the value of a measured signal obtained when an operation signal is given to the control target by using a model, learning a method of generating a model input to be given to the model so that a model output, which is a prediction result yielded by the model, satisfies a target model output value, and determining an operation signal to be given to the control target according to a result of the learning, further comprising steps of:

determining a target model output value by using at least one of an average, a maximum value, and a minimum value of measured signals of the control target as well as a measured signal limit value set in advance; learning a method of generating an initial value of the target model output value so that the initial value is attained, and further learning a method of generating a model input for decreasing or increasing the target model output value when the model output satisfies the target model output value so that the decreased or increased target model output value is attained.

(14) The plant control method described in (12) above, the target model output value is calculated by subtracting the average of the measured signals from their maximum value and further subtracting the absolute value of the subtraction result from the measured signal limit value.

(15) The plant control method described in (13) above, the initial value of the target model output value is calculated by subtracting the average of the measured signals from their maximum value and further subtracting the absolute value of the subtraction result from the measured signal limit value.

(16) The plant control method described in (12) above, when the model output satisfies the target model output value and a positive or negative evaluated value is calculated to learn the model input generation method, an operation method in which an expected value of the evaluated value is maximized or minimized is learned.

(17) The plant control method described in (13) above, when the model output satisfies the target model output value and a positive or negative evaluated value is calculated to learn the model input generation method, an operation method in which an expected value of the evaluated value is maximized or minimized is learned.

(18) A plant control method in which an operation signal is generated so that the value of a measured signal satisfies a target operation value for a thermal power generation plant, which is a control target, the measured signal being obtained when the operation signal is given to the control target, in which a model for predicting the value of a measured signal obtained when an operation signal is given to the control target is used to predict the value of the measured signal obtained when the operation signal is given to the control target, a method of generating a model input to be given to the model is learned so that a model output, which is a prediction result yielded by the model, satisfies a target model output value, and an operation signal to be given to the control target is determined according to a result of the learning, the control method is a plant control method in which an environment limit value of at least one of the carbon monoxide and the nitrogen oxide out of the measured signals is set as a limit value, at least one of an average, a maximum value, and a minimum value of the measured signals, for which the limit value is set, and the limit value are used to determine an initial value of the target model output value, and the model input generation method is learned so that the initial value is attained so that an operation signal for at least an opening of an air damper is generated according to a result of the learning.

The present invention is broadly classified into a first invention and a second invention; the first invention has a function for using at least one calculation result of an average, a maximum value, and a minimum value of measured signals and a limit value of the measured signals to determine the target model output value; the second invention has a function for determining an initial value according to the first invention and another function for decreasing or increasing a target model output value when a model output satisfies the initial value of the target model output value.

In the first invention, even if the measured signals vary, it is possible to reduce the target model output value to a value smaller than the limit value of the measured signals according to the width of the variation, enabling the measured signals to always satisfy the limit value.

Operation targets of some plants are to bring the values of measured signals of a particular type as close to 0 as possible. If the target model output value is set to 0 but this value cannot be attained, the model input generation method cannot be learned in the first invention. To address this problem and to learn an appropriate model input generation method, a contrivance is required for the method of setting the target model output value.

In the second invention, when the operation target of measured signals is to approach as close to 0 as possible, an initial value of the target model output value for the measured signals is set to a value that is larger by some extent. The value gradually approaches 0. Accordingly, it is prevented so that the model input generation method to attain the target model output value cannot be learned.

A controlling device in the best embodiment will be described below with reference to the drawings. However, the present invention is not limited to the embodiment described below.

FIG. 1 is an exemplary block diagram in which the control system in this embodiment is applied to a control target 100. The control system for controlling the control target 100 comprises a controller 200, an input unit 900, a maintenance tool 910, and an image display unit 950. The controller 200 fetches a measured signal 1 from the control target 100 through an external input interface 210. The controller 200 sends an operation signal 16 to the control target 100 through an external output interface 220.

A measured signal 2 fetched by an external input interface 210 is transferred to an operation signal generating device 300 and also stored in a measured signal database 230. An operation signal 15 generated by the operation signal generating device 300 is transferred to the external output interface 220 and also stored in an operation signal database 240.

The operation signal generating device 300 uses learning information 9 stored in a learning information database 280 and control logic information 6 stored in a control logic database 250 to generate an operation signal 15 so that the measured signal 1 from the control target 100 satisfies an operation target value.

Information to be stored in the learning information database 280 is generated by a learning device 400. The learning device 400 is connected to a model 500 and an evaluation value calculating device 600.

The model 500 has a function for simulating characteristics of the control target 100. That is, as in the case in which the operation signal 16 is sent to the control target 100 and thereby the measured signal 1 is obtained, a model input 12 for operating the model 500 is sent to the model 500 and thereby a model output 13 is obtained. The model output 13 is a predicted value for the measured signal 1. The model 500, which simulates the characteristics of the control target 100, has a function for calculating the model output 13 for the model input 12 by using a model expression based on physical laws or a statistical technique.

The evaluation value calculating device 600 has a function for generating an evaluation value 14 by using an evaluation value calculating parameter 8 stored in an evaluation value calculating parameter database 270 and the model output 13. Part of the information stored in the evaluation value calculating parameter database 270 is a target value for the model output 13. The target model output value is generated by a first target value setting device 700 and a second target value setting device 800.

The first target value setting part 700 uses a measured signal 3 stored in the measured signal database 230 and a limit value signal 17 stored in the evaluation value calculating parameter database 270 to generate a first target value signal 4. The second target value setting part 800 uses the measured signal 3 stored in the measured signal database 230, a previous target value signal 18 stored in the evaluation value calculating parameter database 270, and the model output 13 to generate a second target value signal 5.

The learning device 400 uses previous learning information 11 stored in the learning information database 280, a learning parameter 7 stored in a learning parameter database 260, and the model output 13 to generate a model input 12. The model output 13 calculated by the model 500 is used to input the evaluation value 14 calculated by the evaluation value calculating device 600 to the learning device 400. The learning device 400 updates the learning information with the evaluation value 14 and sends updated learning information 10 to the learning information database 280.

An operator of the plant, which is the control target 100, can access information stored in various databases in the controller 200 by using the input unit 900 comprising a keyboard 901 and a mouse 902 as well as a maintenance tool 910 connected to the image display unit 950.

The maintenance tool 910 is comprised of an external input interface 920, a data transmission and reception processing device 930, and an external output interface 940.

An input signal 31 generated by the input unit 900 is sent to the maintenance tool 910 through the external input interface 920. The data transmission and reception processing device 930 fetches database information 30 stored in the controller 200 according to information in an input signal 32. The data transmission and reception processing device 930 sends an output signal 33, which is obtained as a result of processing the database information 30, to the external output interface 940. An output signal 34 is displayed on the image display unit 950.

Although, in this embodiment, all databases are disposed in the controller 200, these databases may be disposed outside of the controller 200. Similarly, although, in this embodiment, all signal processing functions for generating the operation signal 16 are disposed in the controller 200, these functions may also be disposed outside of the controller 200.

Information stored in the databases and the signal processing functions will be described below by using an example in which the control system in the present invention is applied to a thermal power plant.

Figure 2:
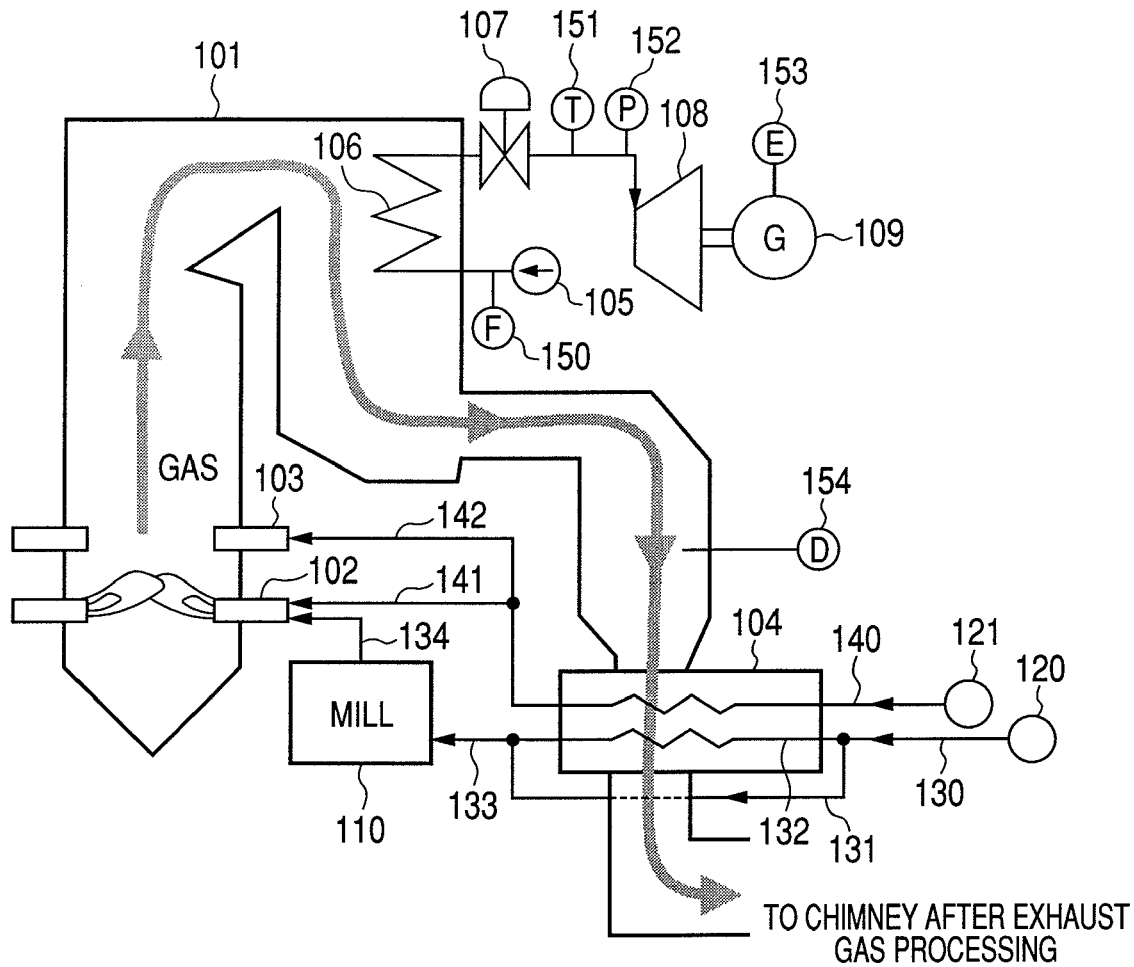
FIG. 2 is a block diagram indicating the structure of a thermal power plant controlled by the controller in the embodiment of the present invention.

FIG. 2 illustrates a thermal power plant. First, a mechanism of power generation in the thermal power plant will be described. Coal (pulverized coal) used as a fuel, primary air for coal transfer, and secondary air for fuel adjustment are sent to a boiler 101 through a burner 102. The coal and primary air are delivered from a pipe 134, and the secondary air is delivered from a pipe 141. After-air for two-stage combustion is supplied through an after-airport 103 to the boiler 101. The after-air is delivered from a pipe 142.

A hot gas generated by the combustion of the coal flows along the path of the boiler 101 and then flows through an air heater 104. After undergoing exhaust gas treatment, the hot gas is expelled to the atmosphere through a chimney.

Feed water circulating in the boiler 101 is delivered through a feed water pump 105 to the boiler 101, and heated by a gas in a heat exchanger 106, resulting in high-temperature, high-pressure steam. Although, in this embodiment, only one heat exchanger is used, a plurality of heat exchangers may be disposed.

The high-temperature, high-pressure steam exits the heat exchanger 106, after which the steam is delivered to a steam turbine 108 through a turbine governor 107. Energy of the steam drives the steam turbine 108, causing an electric power generator 109 to generate electricity.

Various instruments are disposed in the thermal power plant. Information obtained from these instruments is transferred to the controller 200 as the measured signals 1. In FIG. 2, for example, a flowmeter 150, a temperature instrument 151, a pressure instrument 152, a power generation output instrument 153, and a density instrument 154 are shown. The flowmeter 150 measures the flow rate of the feed water supplied from the feed water pump 105 to the boiler 101. The temperature instrument 151 and pressure instrument 152 respectively measure the temperature and pressure of the steam supplied to the steam turbine 108. The amount of electricity generated by the electric power generator 109 is measured by the power generation output instrument 153. Information about the densities of components, such as CO and NOx, included in the gas that is passing through the boiler 101 can be measured by the density instrument 154. In general, many instruments other than shown in FIG. 2 are disposed in thermal power plants, but these instruments are omitted in FIG. 2.

Next, the paths of the primary air and secondary air supplied from the burner 102 and the after-air supplied form the after-airport 103 will be described.

The primary air is delivered from the a fan 120 to a pipe 130, branches into a pipe 132 that passes through the air heater 104 and a pipe 131 that does not pass through the air heater 104 and at an intermediate point joins at a pipe 133, and is delivered to a mill 110. A gas heats the air passing through the air heater 104. The primary air is then used to transfer pulverized coal prepared in the mill 110 to the burner 102.

The secondary air and after-air are delivered from a fan 121 to a pipe 140, are heated by the air heater 104, and branch into a pipe 141 for the secondary air and a pipe 142 for the after-air. The secondary air passing through the pipe 141 is delivered to the burner 102, and the secondary air passing through the pipe 142 is delivered to the after-airport 103.

Figure 3:
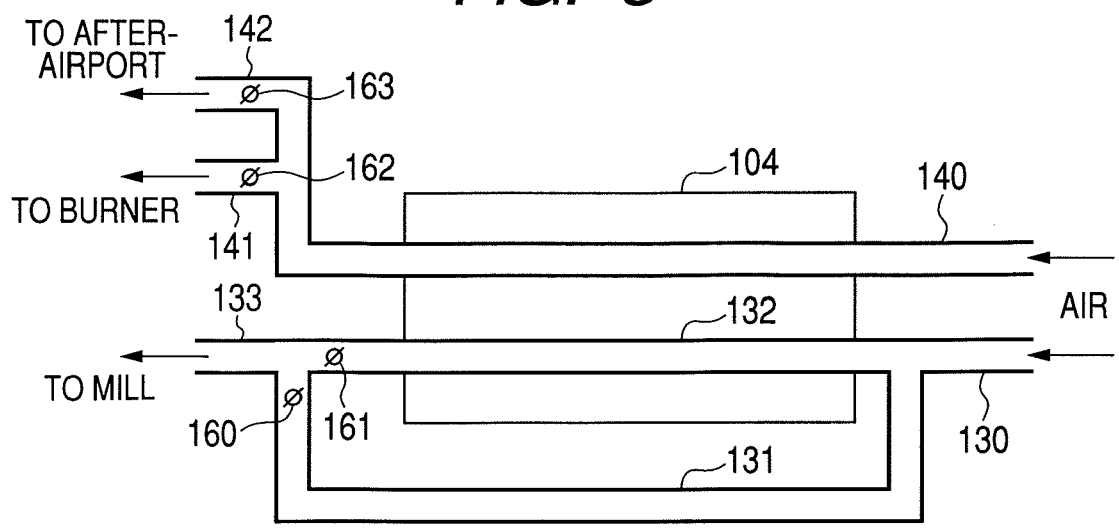
FIG. 3 is an enlarged view of pipes and an air heater in the thermal power plant controlled by the controller in the embodiment of the present invention.

FIG. 3 is an enlarged view of the air heater 104 and the pipes through which the primary air, secondary air, and after-air passes. As shown in FIG. 3, air dampers 160, 161, 162, and 163 are disposed in the pipes. When an air damper is operated, an area through which the air passes in the pipe can be changed, so the amount of air passing through the pipe can be adjusted by operating the air damper.

The operation signals 16 generated by the controller 200 are used to operate the feed water pump 105, mill 110, air dampers 160, 161, 162, and 163, and so on.

The information stored in the measured signal database 230 and operation signal database 240 will be described below. FIGS. 4 and 5 respectively illustrate the types of information stored in the measured signal database 230 and operation signal database 240.

As shown in FIG. 4, information measured by the control target 100 is stored in the measured signal database 230 together with the time of the measurement for each instrument. For example, a flow rate $F_{150}$, a temperature $T_{151}$, a pressure $P_{152}$, a power generation output value $E_{153}$, and an NOx density $D_{154}$ included in an exhaust gas respectively measured by the flowmeter 150, temperature instrument 151, pressure instrument 152, power generation output instrument 153, and density instrument 154 shown in FIG. 2 are stored together with information about time. Although, in FIG. 4, data is stored at one-second intervals, a sampling cycle for data collection can be set to an arbitrary time. In the operation signal database 240 as well, operation signals such as a command signal for the feed water flow rate are stored together with information about time, as shown in FIG. 5.

Operations of the learning device 400, model 500, and evaluation value calculating device 600 will be described below.

The learning device 400 learns the method of generating the model input 12 for the model 500, which simulates the characteristics of the control target 100, so that the model output 13 satisfies the target model output value. The learning device 400 uses the evaluation value 14, which is an output from the evaluation value calculating device 600 on the basis of the model output 13, to execute the learning.

The reinforcement learning theory described in Non-patent Document 1 is an algorithm for executing this type of learning. In the reinforcement learning, an evaluated value (compensation) is used to learn the method of generating the model input 12 through interaction between the learning device 400 and model 500 so that the target model output value is attained. When the reinforcement learning is applied, it is possible to learn the method of generating the model input 12 by which an expected value of the evaluated value obtained at present and in the future is maximized.

In this embodiment, an example in which an actor-critic technique is applied is described as the reinforcement learning method. In addition to the reinforcement learning method, optimization technology such as a genetic algorithm or a linear and non-linear programming can be applied as the learning method in the controller 200 in the present invention.

Figure 6:
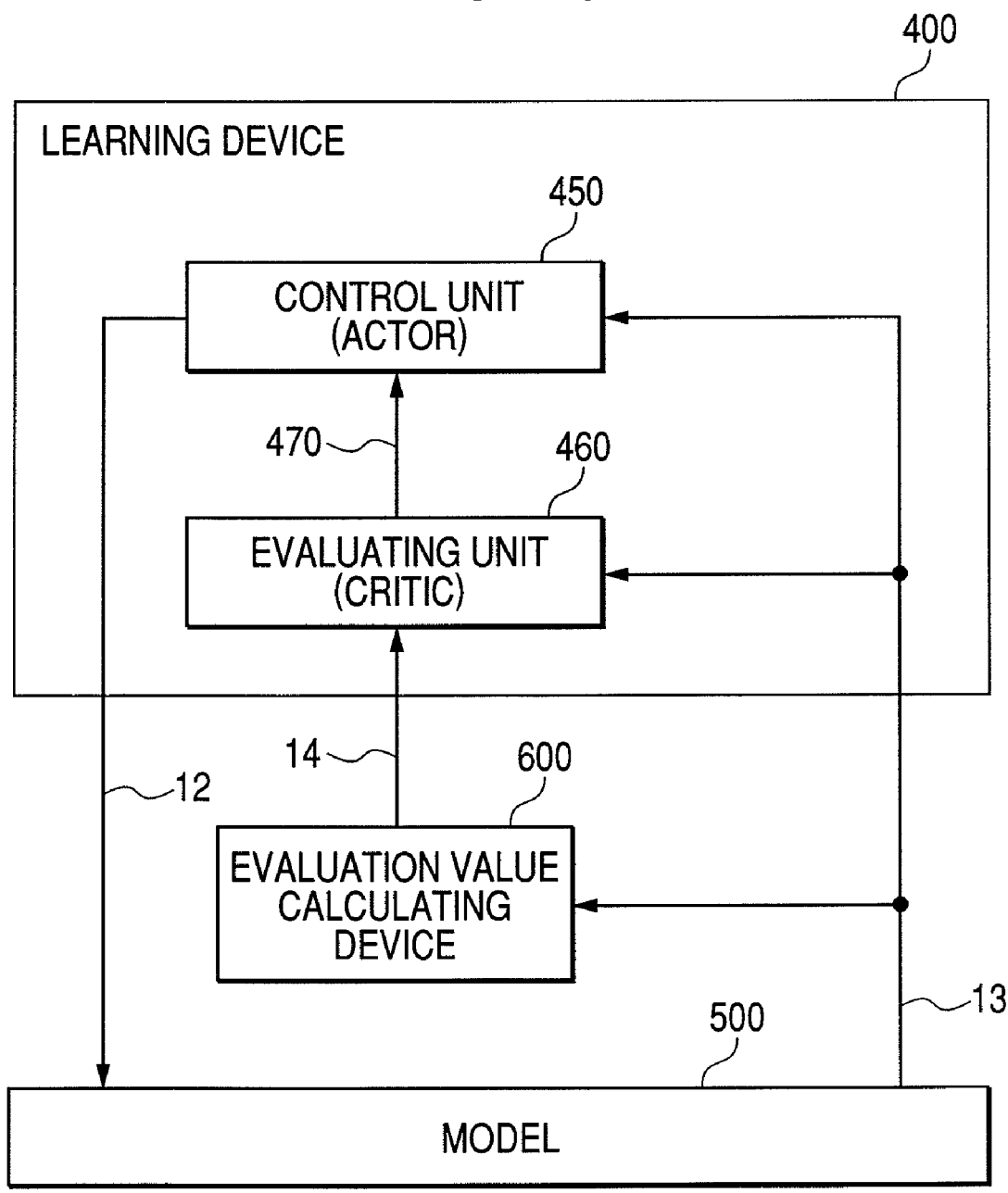
FIG. 6 illustrates the actor-critic method used in the controller in the embodiment of the present invention.

FIG. 6 illustrates an overview of the actor-critic method. As indicated in FIG. 6, a control unit 450 for generating the model input 12 and an evaluating unit 460 for evaluating the value of a state are used in the actor-critic method. The evaluating unit 460 calculates a state value according to the model output 13, obtains the evaluation value 14, which is an output signal from the evaluation value calculating device 600, and calculates a TD error signal 470 by using equation (1).

[Equation 1]

$$\delta = r + \gamma V(s_{t+1}) - V(s_t) \tag{1}$$

where $\delta$ is TD error, $\gamma$ is a discount rate, and $V(s)$ is the value of a state s.

The TD error signal 470 calculated from equation (1) is transferred from the evaluating unit 460 to the control unit 450.

Figure 7:
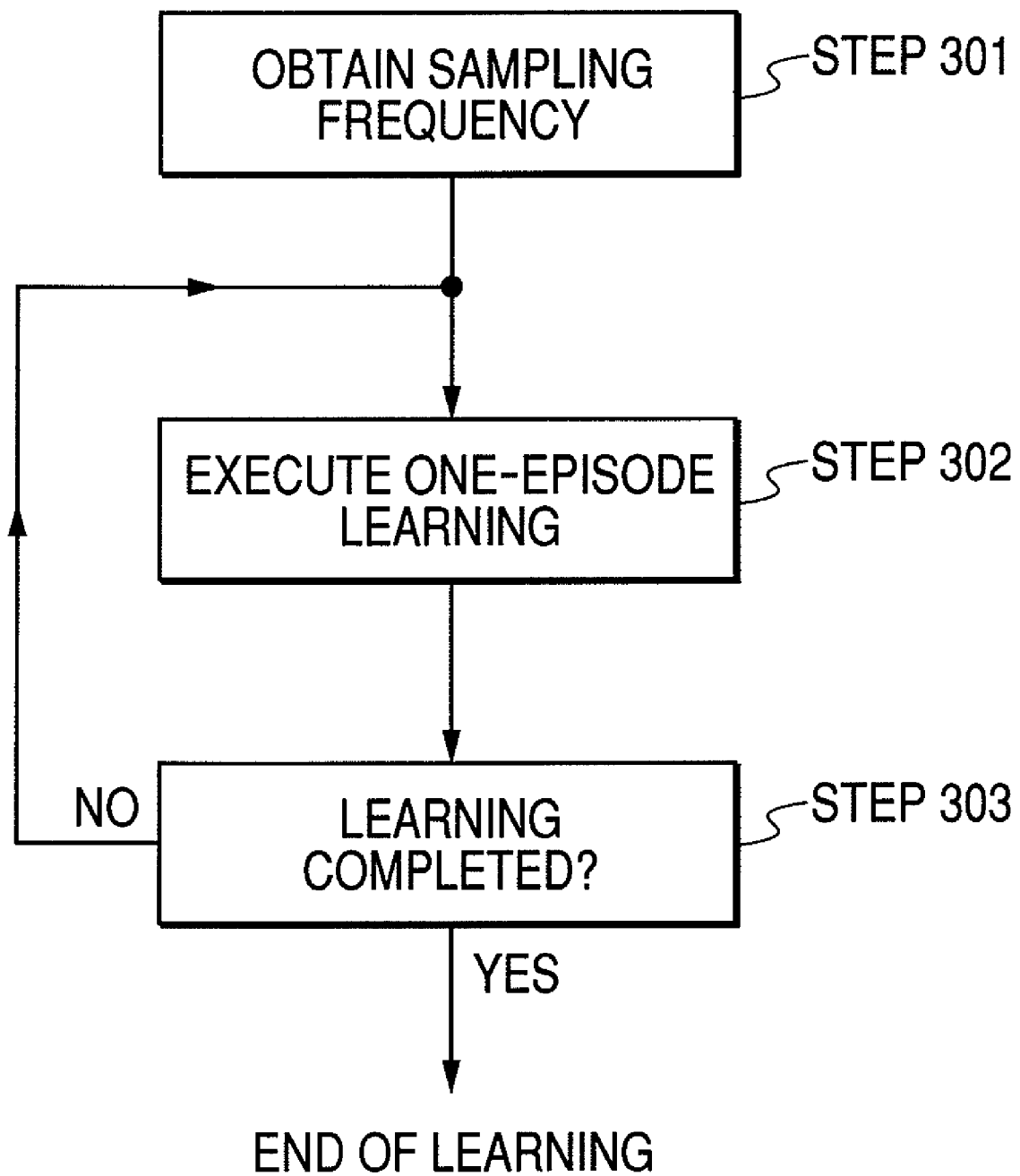
FIG. 7 is a flowchart of an algorithm executed by the controller in the embodiment of the present invention.
Figure 8:
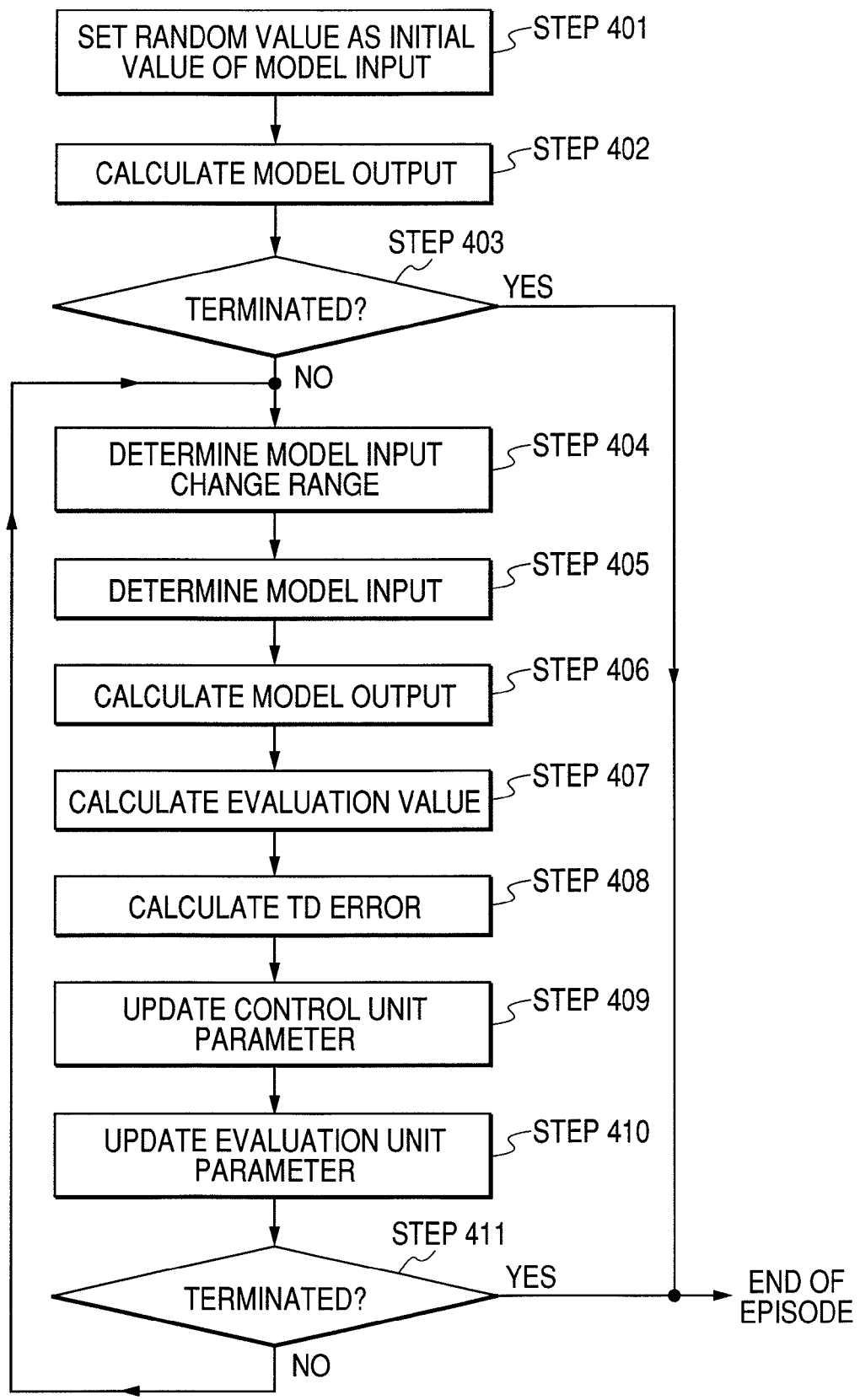
FIG. 8 is flowchart executed during the execution of one-episode learning in the flowchart of the algorithm executed by the controller in the embodiment of the present invention.

FIGS. 7 and 8 are flowcharts in the actor-critic method. Design parameters such as the discount ratio $\gamma$, which are required to execute the procedures in these flowcharts, are stored in the learning parameter database 260, evaluation value calculating parameter database 270, and learning information database 280. Types of information stored in these databases and the method of storing the design parameters in them will be described later.

As shown in FIG. 7, a sampling period T for control is obtained in step 301, after which one-episode learning is executed in step 302. In step 302, the learning device 400, model 500, and evaluation value calculating device 600 operate to execute the reinforcement learning described above. In step 303, whether learning has been completed is determined. This step is provided to terminate the learning within the sampling period for control. When time taken to execute learning is shorter than T, the sequence returns to step 302; when the time exceeds T, the learning is terminated. The flowchart in FIG. 7 is repeatedly executed while the control target 100 is controlled.

FIG. 8 is a flowchart for illustrating operation during the execution of the one-episode learning in step 302 in FIG. 7.

In step 401, a random value is set as an initial value of the model input. The model input 12 prepared in step 401 is then entered in the model 500 to obtain the model output 13 in step 402.

In step 403, the evaluation value calculating device 600 compares the model output 13 with the target model output value stored in the evaluation value calculating parameter database 270. When the model output 13 satisfies the target model output value, the episode is terminated; when it does not, the sequence proceeds to step 404.

In step 404, the learning device 400 uses information stored in the learning information database 280 to determine a model input change range Δa. The method of determining Δa will be described below.

In step 405, the model input 12 is determined according to equation (2).

[Equation 2]

$$a(t+1)=a(t)+\Delta a \qquad (2)$$

In step 406, the model input 12 determined in step 405 is entered in the model 500 to obtain the model output 13.

In step 407, the evaluation value calculating device 600 uses the model output 13 obtained in step 406 to calculate the evaluation value signal 14.

In step 408, TD error is calculated from the information stored in the learning information database 280 by using equation (1).

In step 409, the TD error calculated in step 408 is used to update the parameter for the control unit 450, and the updated value is stored in the learning information database 280.

In step 410, the TD error calculated in step 408 is used to update the parameter for the evaluating unit 460, and the updated value is stored in the learning information database 280.

In step 411, a termination decision is made as in step 403.

A case in which the control unit 450 uses a normal random number to create the model input 12 and the evaluating unit 460 uses the tile coding technique to calculate the state value will be described below. Techniques other than those used in this embodiment may be used to configure the control unit 450 and evaluating unit 460.

Figures 9, 10:
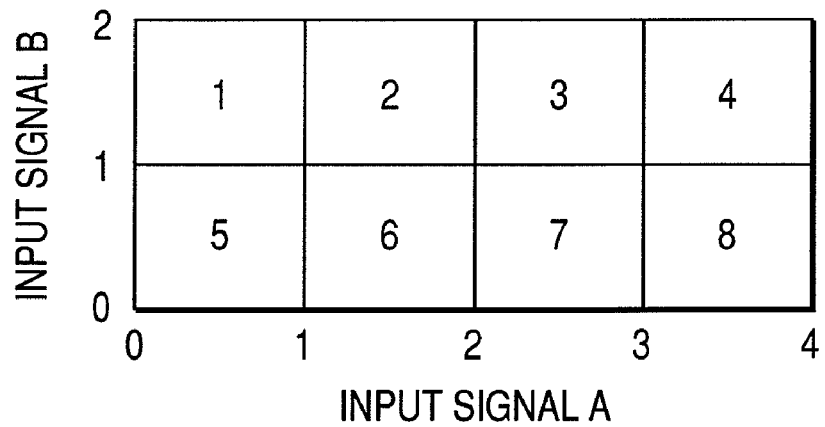
FIG. 9 illustrates the tile coding technique applied to an evaluating unit in a learning device in the controller in the embodiment of the present invention.
FIG. 10 illustrates an example of the data stored in a learning information database in the controller in the embodiment of the present invention.

The evaluating unit 460 uses the tile coding technique to divide a state. FIG. 9 illustrates the tile coding technique. In the tile coding technique, an input space is divided and an area to which the state belongs is determined so that a continuous state is recognized as a discrete state. Each area is called a tile.

For example, suppose that the input signal 12 entered into the model 500 is a two-dimensional signal comprised of an input signal A and an input signal B and that input signal A is between 0 and 1 and input signal B is between 1 and 2. Then, the input signal 12 belongs to the tile with state number 1 in FIG. 9. Information in which state numbers and value functions are associated is stored in the learning information database 280, as mapped in FIG. 10. The evaluating unit 460 uses the value of the input signal 12 when the model output 13 is obtained and the information stored in the learning information database 280 to calculate the value of the state.

The evaluating unit 460 updates the state value with TD error $\delta_1$ according to equation (3), where $\beta_1$ is a learning rate.

[Equation 3]

$$V(s_t) \leftarrow V(s_t) + \beta_1 \delta_t \qquad (3)$$

Figure 11A:
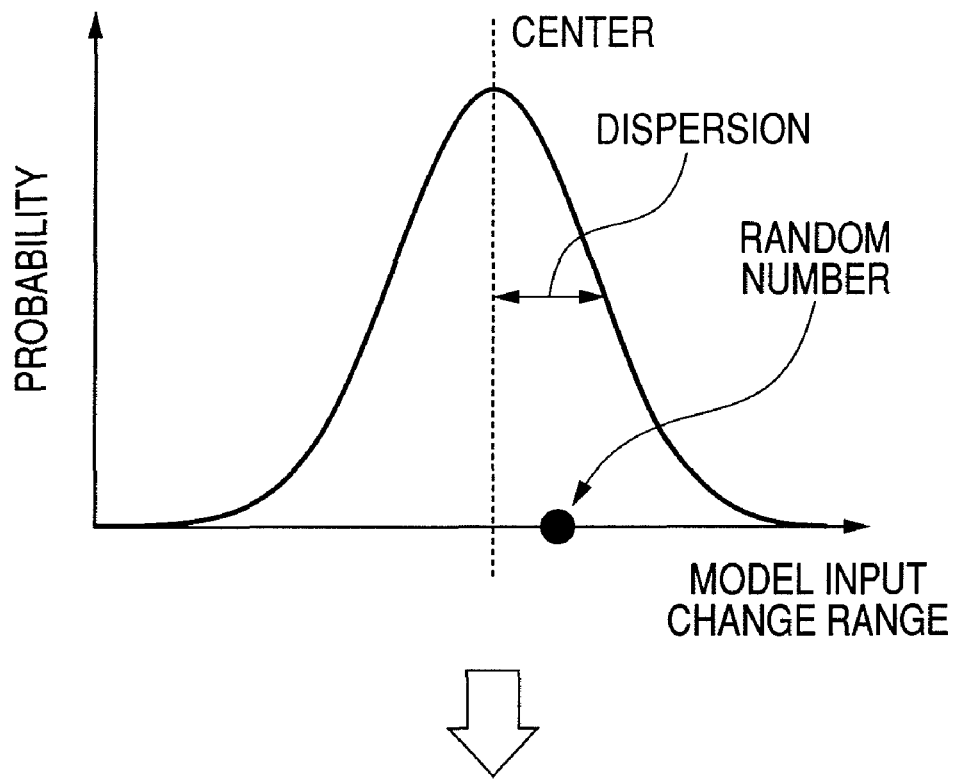
FIGS. 11(a) and 11(b) illustrate a method for determining a model input change range by using a normal distribution, the method being applied to the control unit in the learning device in the controller in the embodiment of the present invention.
Figure 11B:
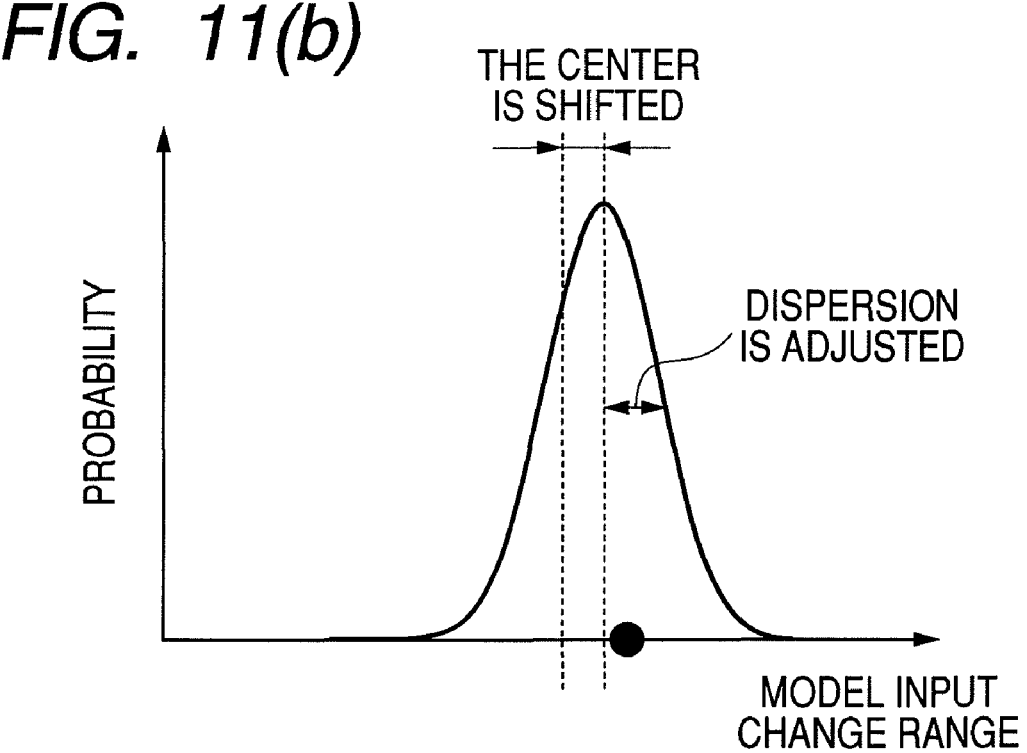

FIGS. 11(a) and 11(b) illustrate the method for calculating the model input change range in step 404 and the method for updating the control unit parameter in step 409.

The normal distributions shown in FIGS. 11(a) and 11(b) are generated by using two parameters, the center of the normal distribution and a standard deviation. The normal distributions are plotted with the model input change range on the horizontal axis and the generation probability on the vertical axis.

Next, the method of updating the parameter for the control unit 450 will be described.

Suppose that when a random number shown in FIG. 11(a) is generated in a state and a model input is modified according to the random number, the TD error is positive. This indicates that the execution of the model input brought an evaluation value better than expected. Then, a parameter is updated that when the same state is reached, the probability that the random number is selected will be increased. Specifically, the center of the normal distribution is shifted to the positive direction as shown in FIG. 11(b). In addition, since the generated random number is inside the standard deviation, the parameter is updated so that the value of the standard deviation is reduced.

The center c(St) and standard deviation σ(St) of the normal distribution are updated according to equations (4) and (5), where $\beta_2$ and $\beta_3$ are learning ratios.

[Equation 4]

$$c(s_t) \leftarrow c(s_t) + \beta_2 \delta_t (a_t - c(s_t)) \qquad (4)$$

[Equation 5]

$$\sigma(s_t) \leftarrow \sigma(s_t) + \beta_3 \delta_t (|a_t| - \sigma(s_t)) \qquad (5)$$

FIG. 12 illustrates the information stored in the learning information database 280, which is information related to the control unit 450. To generate the normal distributions in FIGS. 11(a) and 11(b), two parameters and its center and dispersion are required as described above. These parameters are given for each state number. The values of the parameters are associated with the state numbers, and stored in the learning information database 280, as mapped in FIG. 12.

FIG. 13 illustrates how the information stored in the learning parameter database 260 is mapped. Learning rates and other parameters required to execute steps 409 and 410 in the flowchart in FIG. 8 are stored, as shown in FIG. 13.

In step 407, the learning parameter database 260 and model output 13 are used to generate the evaluation value 14.

In the reinforcement learning, the method of generating the model input 12 is learned so that the expected value of the evaluation value 14 is maximized. When the model output 13 satisfies the target model output value, it is desirable that the value of the evaluation value 14 be made larger.

In an exemplary method of generating this type of evaluation value 14, when the model output 13 satisfies the target model output value, a positive value, 1 for example, is used as the evaluation value. In another method, when the target model output value is not attained, the target model output value and a function that is inversely proportional to the error of the model output 13 are used to calculate the evaluation value 14. A method in which the above methods are combined to calculate the evaluation value 14 can also be considered.

Information about the target value of the model output 13 is stored in the evaluation value calculating parameter database 270.

FIG. 14 illustrates how the information stored in the evaluation value calculating parameter database 270 is mapped. Limit values of the measured signals 1, requirements, and target values for control to be attained for the model output 13 are stored, as mapped in FIG. 14. The operator of the plant, which is the control target 100, sets the limit values and requirements as described below. Each limit value is set for the measured signal 1, and must not be exceeded by the measured signal 1 obtained from the control target 100. Each requirement shown in FIG. 14 is an attribute by which, for example, it is defined that the object is to have the measured signal 1 fall to or below the limit value or to reduce the measured signal 1 to a value as small as possible below the limit value. Each target value shown in FIG. 14 is the target value of the model output 13 when a certain model input 12 is set.

Target operation values in FIG. 14 are set by using the first target value setting device 700 and second target value setting device 800 in FIG. 1.

Figure 15:
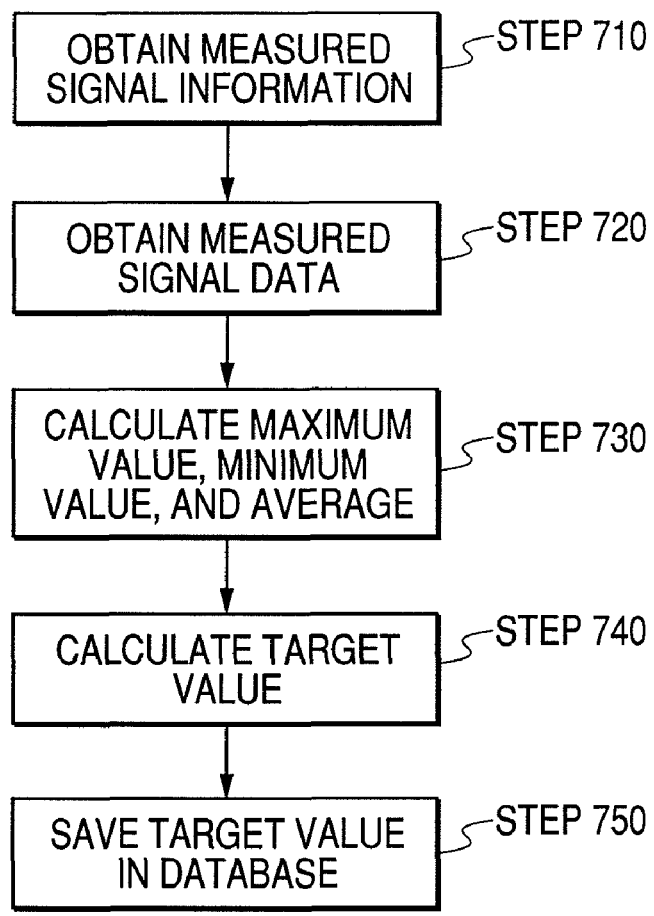
FIG. 15 is an operation flowchart executed by the first target value setting device in the controller in the embodiment of the present invention.

FIG. 15 is a flowchart illustrating the operation of the first target value setting device 700.

Figure 16:
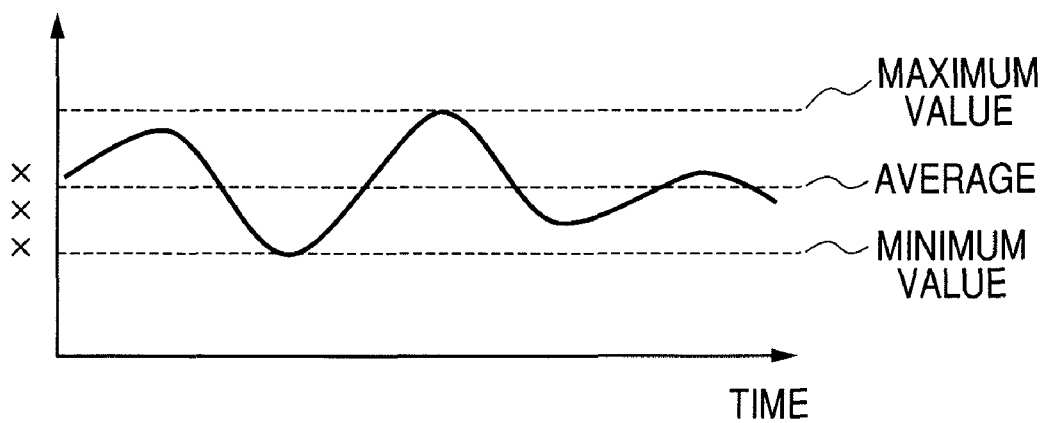
FIG. 16 illustrates a maximum value, minimum value, and average of the measured data.

Of the measured signal evaluation items stored in the evaluation value calculating parameter database 270, the items of measured signals for which an object is to satisfy a limit value as well as the limit value are extracted in step 710. In step 720, data, which is stored in the measured signal database 230, concerning the control amount extracted in step 710 is obtained. In step 730, a maximum value, minimum value, and average of the measured signals are calculated from the data obtained in step 720. FIG. 16 illustrates the maximum value, minimum value, and average of the measured signals. These values are calculated by the first target value setting device 700. In step 740, the target model output value is calculated by using equation (6).

[Equation 6]

$$D_i(k)=H_i(k)-(M_i(k)-A_i(k))\ 0\leq i\leq k \quad (6)$$

where Dj(k) is the target model output value, Hj(k) is the limit value, Mj(k) is the maximum value, Aj(k) is the average, and k is the number of items for the measured signals extracted in step 710.

Finally, the target value calculated by using equation (6) is stored in the evaluation value calculating parameter database 270 in step 750.

Figure 17:
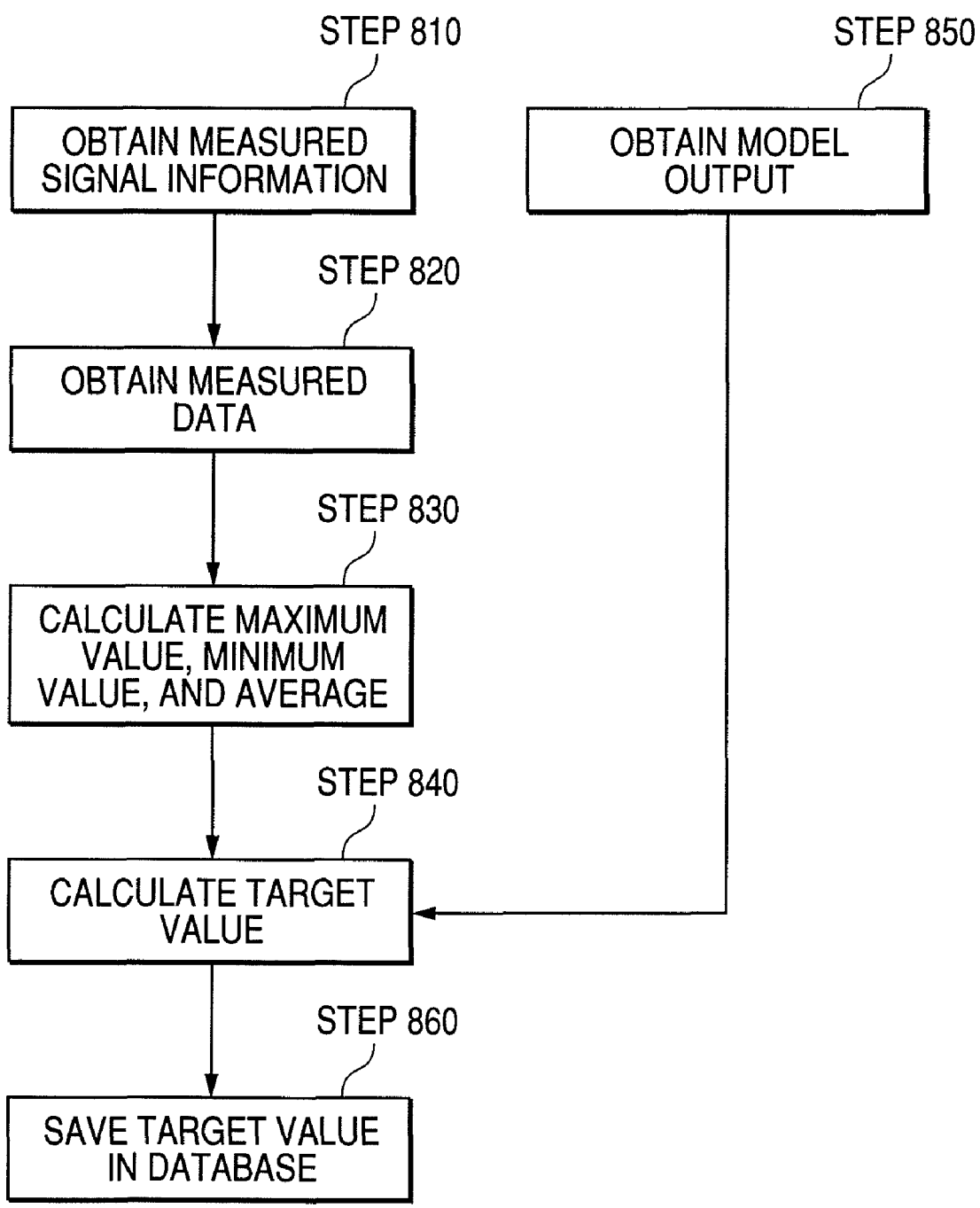
FIG. 17 is an operation flowchart executed by the second target value setting device in the controller in the embodiment of the present invention.

The operation of the second target value setting device 800 will be explained next with reference to FIG. 17. FIG. 17 is a flowchart illustrating the operation of the second target value setting device 800.

Of the measured signal evaluation items stored in the evaluation value calculating parameter database 270, the items of measured signals for which an object is to satisfy a limit value and make a reduction as much as possible, the limit values of the items, and target operation values are extracted in step 810. In step 820, data, which is stored in the measured signal database 230, concerning the measured signal items extracted in step 810 is obtained. In step 830, a maximum value, minimum value, and average of the measured signals are calculated for each measured signal from the data obtained in step 820. In step 840, the model output 13 is obtained. In step 850, the initial value of the target model output value is calculated by using equation (7).

[Equation 7]

$$D_j(k)=H_j(k)-(M_j(k)-A_j(k))\ 0\leq j\leq l \quad (7)$$

where Dj(k) is the target model output value, Hj(k) is the limit value, Mj(k) is the maximum value, Aj(k) is the average, and l is the number of evaluation items for the measured signals extracted in step 810.

When the value of the model output 13 is reduced to a value smaller than Dj(k) during the execution of the flowchart in FIG. 7, the target model output value is updated to a smaller value by using equation (8).

[Equation 8]

$$D_j(k+1)=D_j(k)-\psi \quad (8)$$

where φ is a parameter set by the operator.

It is also possible to set the minimum model output obtained during the execution of the learning as the target model output value.

In this embodiment, a case in which the target model output value is updated to a smaller value has been described. To set the measured signal to a value as large as possible, however, the target model output value can be updated to a larger value.

Accordingly, the learning device 400 can learn the method of generating the model input 12 so that the object of the measured signal, which is to make a reduction as much as possible, is satisfied.

Next, a method by which the control target 100, that is, the maintenance tool 910 which the operator uses to display information in databases on the image display unit 950 will be described. FIGS. 18 to 23 are exemplary screens displayed on the image display unit 950. The operator uses the keyboard 901 and mouse 902 to, for example, enter parameter values.

Figure 18:
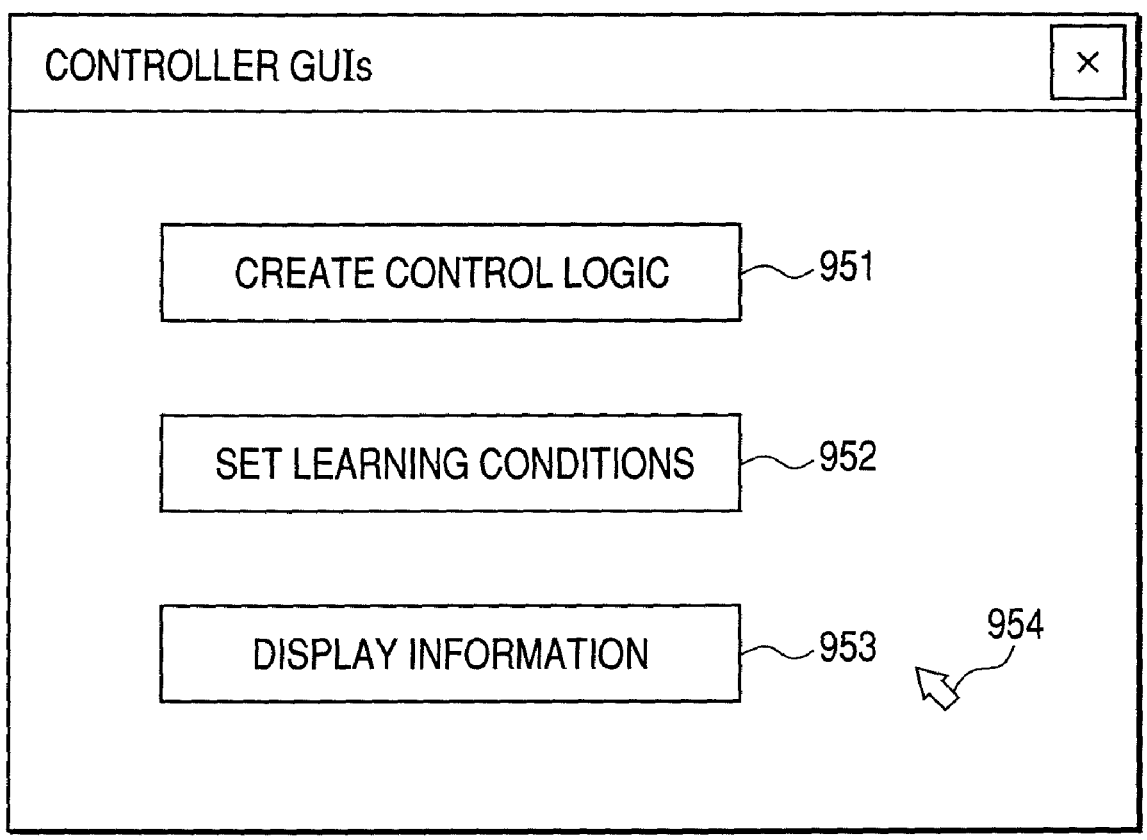
FIG. 18 shows an initial screen displayed on the image display unit in the embodiment of the present invention.

FIG. 18 shows an initial screen displayed on the image display unit 950. The operator selects a necessary button out of a control logic creation button 951, a learning condition setting button 952, and an information display button 953 by using the mouse 902 to move a cursor 954 and clicking the mouse 902.

Figure 19:
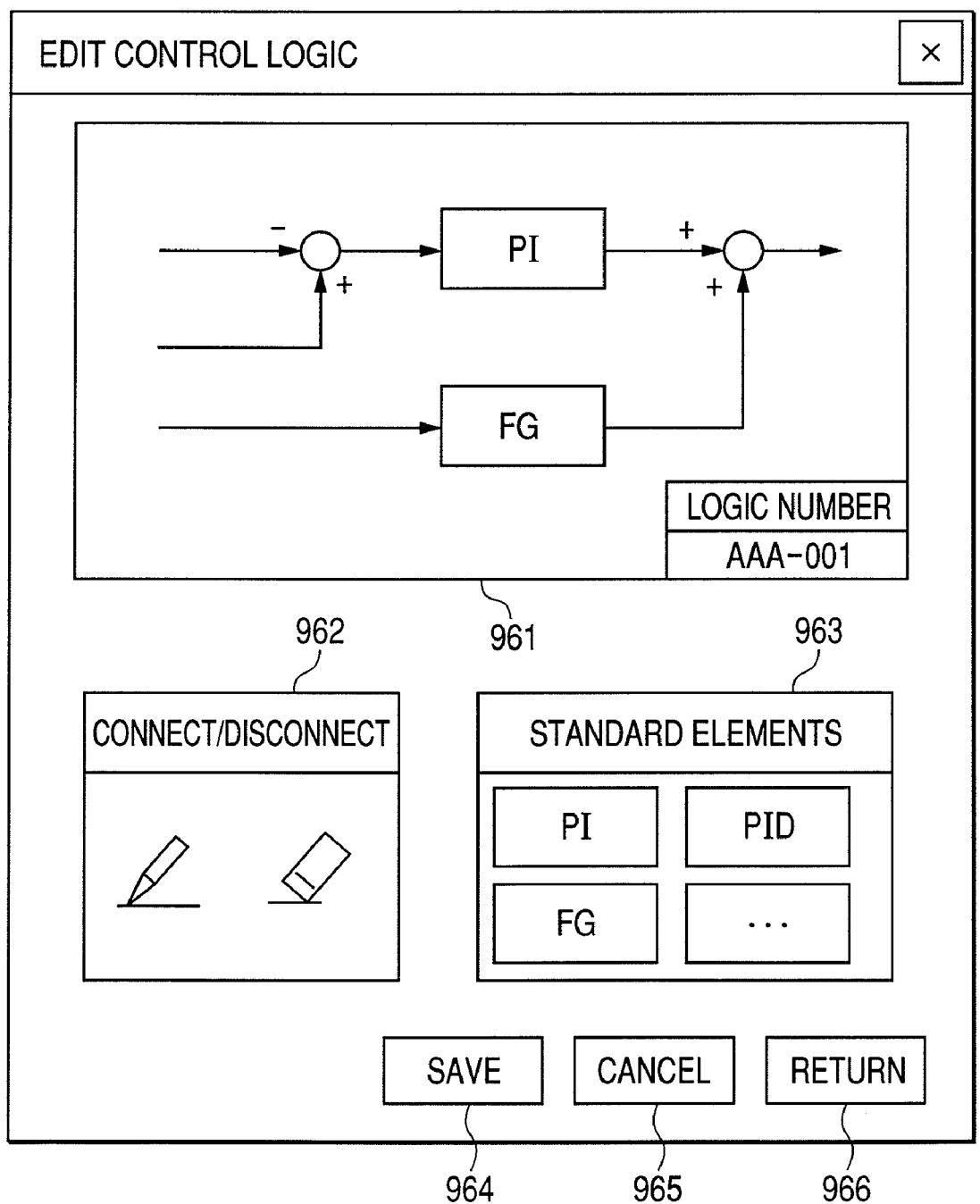
FIG. 19 shows an Edit control logic screen displayed on the image display unit in the embodiment of the present invention.

FIG. 19 shows an Edit control logic screen that is displayed when the control logic creation button 951 is clicked. The operator selects necessary modules from standard element modules 963 stored in advance and moves the selected modules to the logic editing screen 961. Modules are connected by using Connect/Disconnect 962. A control logic drawing created in FIG. 19 is stored in the control logic database 250 through the data transmission and reception processing device 930 when the Save button 964 is clicked. The operation signal generating device 300 uses information on the control logic drawing to create the operation signal 15 when measured signal 2 is entered. The operation signal generating device 300 can also use information stored in the learning information database 280 together to create the operation signal 15. When information about the state number and center shown in FIG. 12, which is stored in the learning information database 280, is used, it is possible to create the operation signal 15 having the same value as the model input 12 that causes the model output 13 to have a desirable value.

When the Cancel button 965 is clicked, the control logic drawing created in FIG. 19 is not stored. When the Return button 966 is clicked, the screen in FIG. 18 is displayed again.

FIG. 20 illustrates a learning condition setting screen, which is displayed when the learning condition setting button 952 is clicked in FIG. 18.

The operator enters information about controlled amounts and limit values in the limit value input area 971. The operator also enters A in the requirement field when the object is to have the control amount fall to or below the limit value, and B when the object is to have the control amount fall to a value as small as possible below the limit value. In the parameter setting area 972, the operator enters setting parameters required to execute the flowchart in FIG. 7. In the operation end setting area 973, the operator enters the names of operation ends used to learn the operation method according to the flowchart in FIG. 7 as well as the operation range and the number of divisions for tile coding.

When the Save button 974 in FIG. 20 is clicked, the information entered in the limit value input area 971 is stored in the evaluation value calculating parameter database 270, the information entered in the parameter setting area 972 is stored in the learning parameter database 260, and the information entered in the operation end setting area 973 is stored in the learning information database 280.

When the Cancel button 975 is clicked, the information entered in the limit value input area 971, parameter setting area 972, and operation end setting area 973 is discarded. When the Return button 976 is clicked, the screen in FIG. 18 is displayed again.

Figure 21:
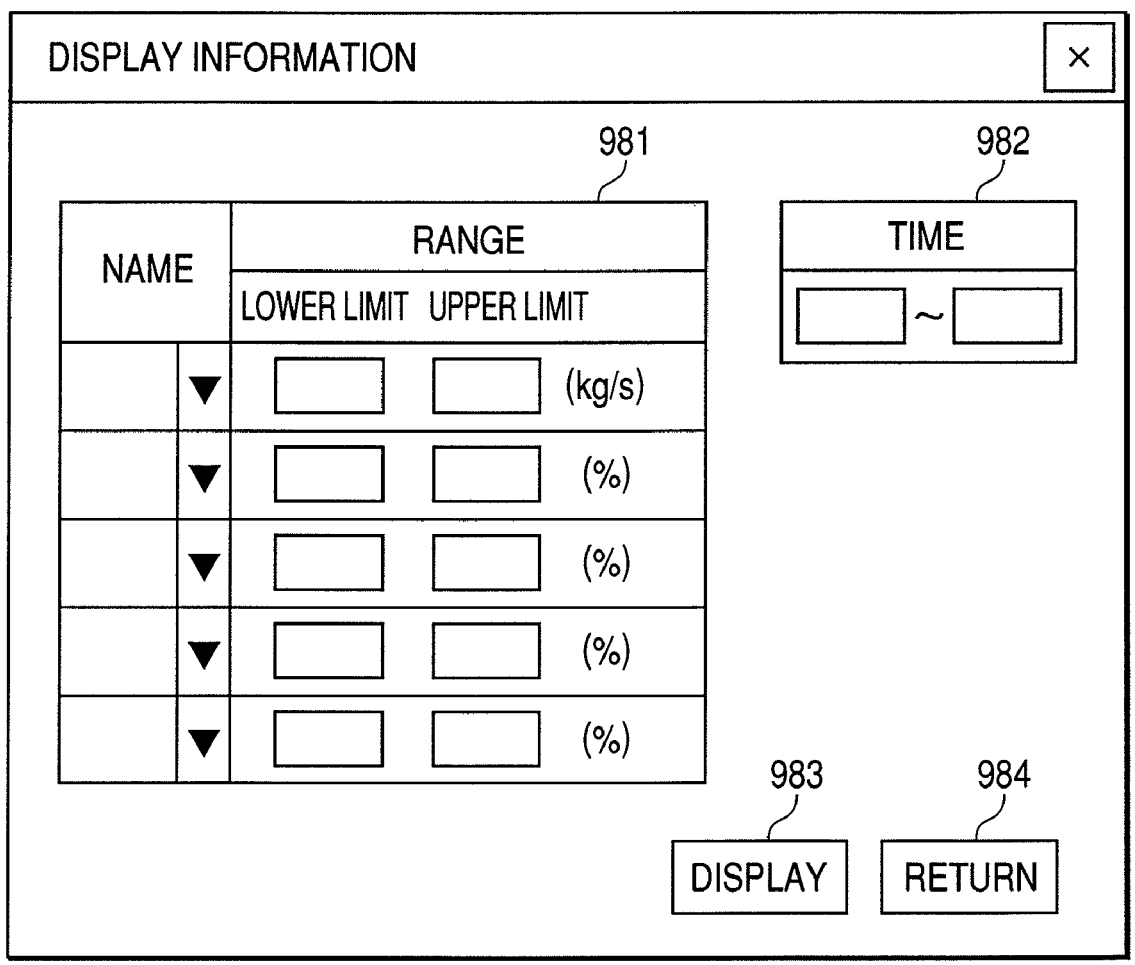
FIG. 21 illustrates a Set display information screen on the image display unit in the embodiment of the present invention.

FIG. 21 illustrates a screen on which to set conditions to display information stored in the measured signal database 230 and operation signal database 240 on the image display unit 950. When the Information Display button 953 is clicked in FIG. 18, the screen in FIG. 21 is displayed.

The operator enters, in the input area 981, a measured signal or operation signal to be displayed on the image display unit 950 together with its range (upper limit and lower limit). The operator also enters a time at which to provide a display in the time input field 982.

Figure 22:
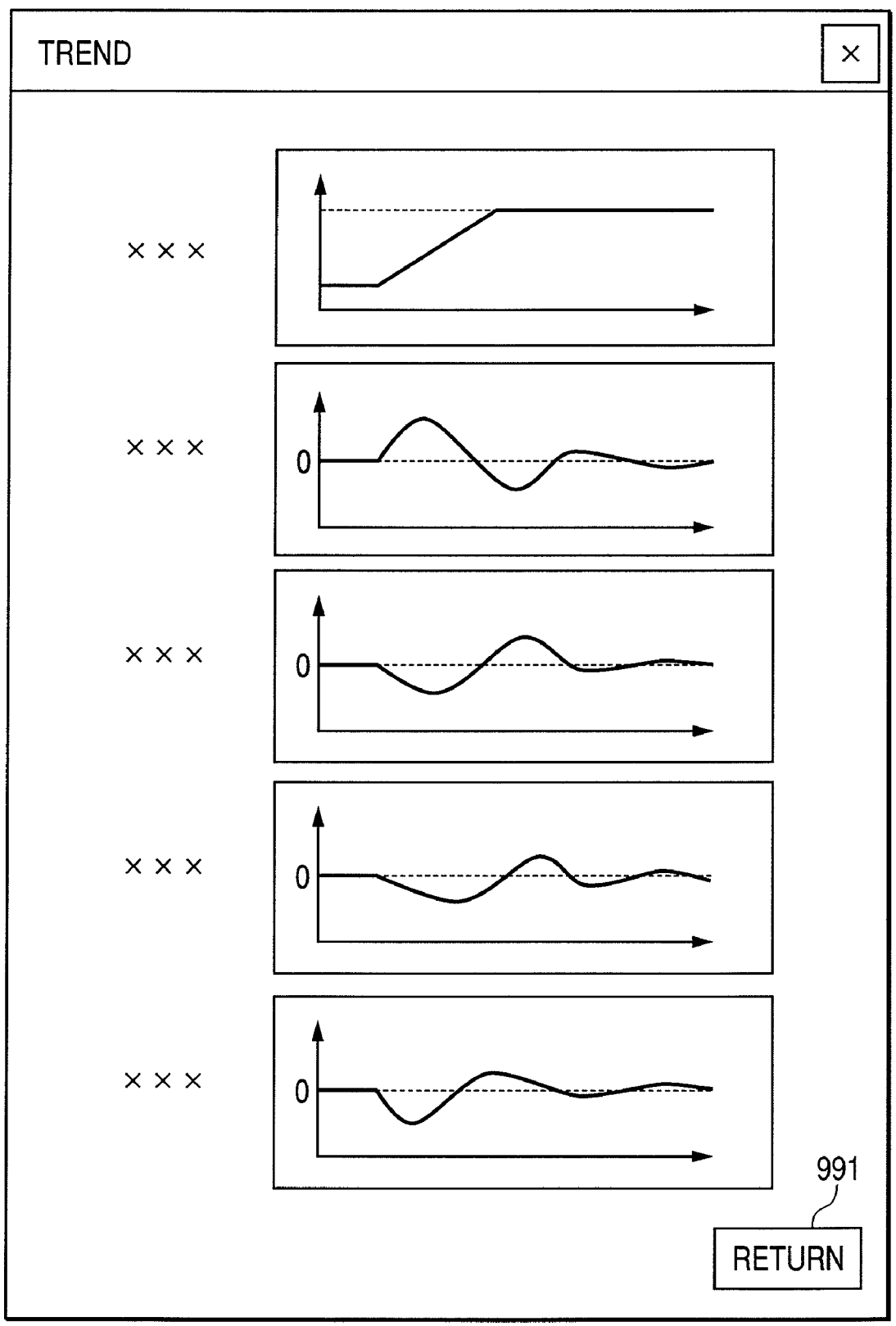
FIG. 22 illustrates trend graphs for measured values, which are displayed on the image display unit in the embodiment of the present invention.

When the Display button 983 is clicked, trend graphs are displayed on the image display unit 950 as shown in FIG. 22. When the Return button 991 in FIG. 22 is clicked, the screen in FIG. 21 is displayed again.

When the Return button 984 in FIG. 21 is clicked, the screen in FIG. 18 is displayed again.

In addition to the images described above, arbitrary information stored in the databases in the controller 200 can also be displayed on the image display unit 950 in an arbitrary form.

The controller 200 in the present invention may be applied to a case in which the control target 100 is a thermal power plant. Effects in this case will be described below.

When the controller 200 in the present invention is used to operate an air damper in a thermal power plant, CO and NOx can be controlled. Effects obtained by using the controller 200 to control CO and NOx will be described below.

Figure 23:
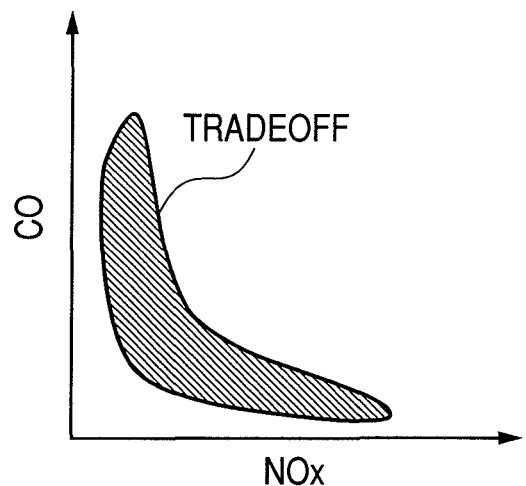
FIG. 23 is a graph illustrating basic characteristics of CO and NOx emitted from a thermal power plant.

FIG. 23 illustrates basic characteristics of CO and NOx. In general, CO and NOx have a tradeoff relation, as illustrated in FIG. 23; when CO is reduced, NOx increases; when NOx is reduced, CO increases.

There are regulations on the CO and NOx exhausted from chimneys in thermal power plants. To observe regulations on NOx, a gas from the outlet of a boiler is delivered to a denitration apparatus and treated therein. The amount of ammonia used in the denitration apparatus is consumed more as the NOx density at the inlet of the denitration apparatus increases. When the amount of NOx at the inlet of the denitration apparatus is reduced as much as possible to reduce the amount of ammonia consumed, the running cost can be reduced.

Accordingly, it is desirable to prevent CO from exceeding its limit value and reduce NOx as much as possible.

Figure 24:
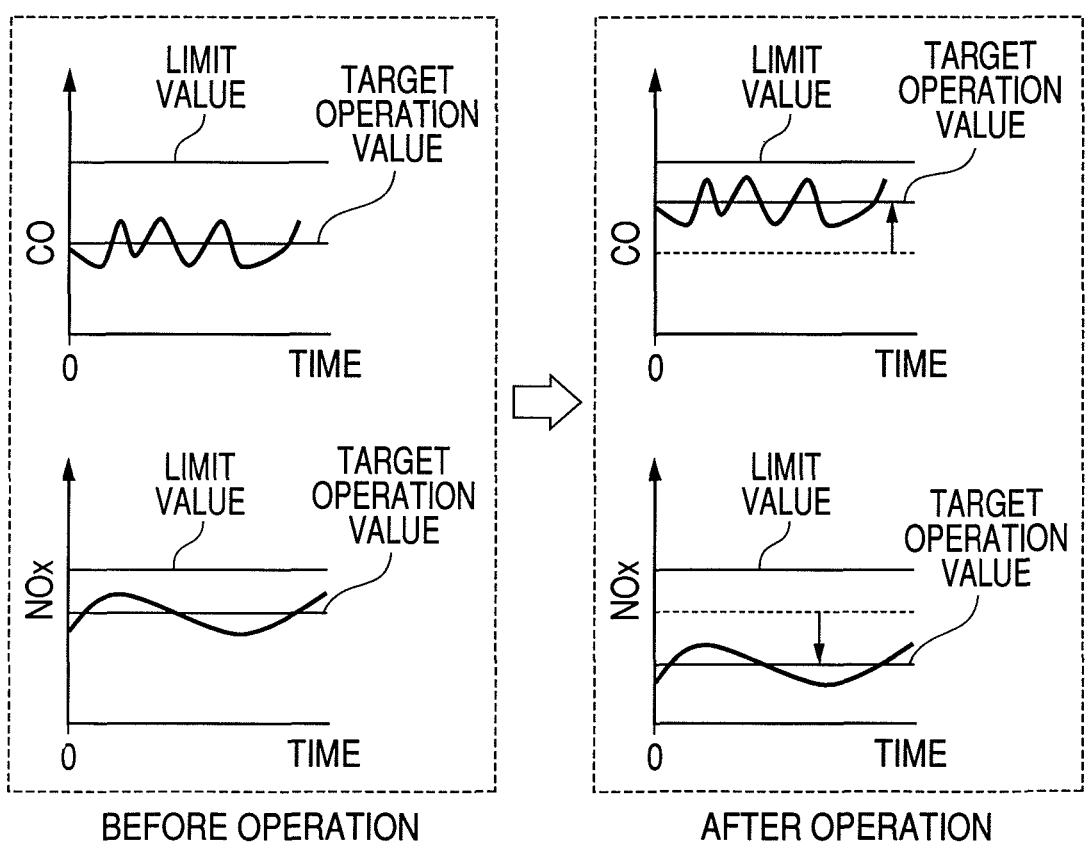
FIG. 24 are graphs illustrating an effect obtained when the controller in the embodiment of the present invention is used to control a thermal power plant.

FIG. 24 illustrates trends in the CO density and NOx density at the inlet of the denitration apparatus before and after the operation signal generating device 300 in the controller 200 performs an operation based on information stored in the learning information database 280.

As shown in FIG. 24, the values of CO and NOx vary with time. Information about this variation can be calculated in step 730 in FIG. 15 and step 830 in FIG. 17.

In calculation of the target values in steps 740 and 840, equations (6) and (7) are used, that is, the average of the signals is subtracted from their maximum value and the subtracted results are further subtracted from the limit value. Accordingly, even if the measured signals vary, the limit value is less likely to be exceeded. That is, the target values are calculated by the first target value setting device 700 and second target value setting device 800 with variations in measured values taken into consideration, so these values are target model output values that do not exceed the measured values even when the measured values vary.

Accordingly, the operation signal 15 generated by the operation signal generating device 300 is a signal generated by using information in the learning information database 280 in which information about the control method that satisfies the target operation value described above is stored.

As illustrated in FIG. 24, CO does not exceed the limit value even after the operation is completed. A reduction in NOx from the value before the operation can also be obtained.

The invention claimed is:

1. A computer-implemented plant controlling device having an operation signal generator for generating an operation signal to be given to a plant, the plant controller comprising:
   a processor;
   a model configured to predict the value of a measured signal obtained when an operation signal is given to the plant;
   a database configured to store measured signal limit values set in advance;
   an external input interface configured to fetch measured signals from the plant;
   a measured signal database configured to store the values of the fetched measured signals;
   a plant model output value determining device configured to determine a plant model output value by using the measured signal obtained from the plant and at least one of the measured signal limit values set in advance, including a function configured to determine the plant model output value by using the measured signal limit values and at least one of an average value, a maximum value, and a minimum value that are calculated from the measured signals stored in the measured signal database; and
   a learning device configured to learn a method of generating a model input such that a model output, which is a prediction result yielded by the model, satisfies the plant model output value;
   wherein the operation signal generating device is configured to generate an operation signal with reference to a database that stores results of learning obtained by the learning device;
   wherein the learning device configured to learn so as to attain the determined plant model output value.

2. The plant controlling device according to claim 1, wherein
   the function configured to determine the plant model output value by subtracting the average of the measured signals from the maximum value of the measured signals, and by further subtracting the absolute value of the subtraction result from the measured signal limit value, in order to determine the plant model output value.

3. The plant controlling device according to claim 1, further comprising:
   an evaluated value calculating device configured to calculate an evaluated value used for the learning;
   wherein when the plant model output value is attained, the evaluated value calculating device yields a positive or negative evaluated value; and
   wherein the learning device is configured to learn an operation method in which an expected value of the evaluated value is maximized or minimized.

4. The plant controlling device according to claim 1, further comprising:
   a user interface for accepting the measured signal limit values.

5. A computer-implemented plant controlling device having an operation signal generator for generating an operation signal to be given to a plant, the plant controller comprising:
   a processor;
   a model configured to predict the value of a measured signal obtained when an operation signal is given to the plant;
   a plant model output value determining device configured to determine a plant model output value by using the measured signal obtained from the plant and a measured signal limit value set in advance; and a learning device configured to learn a method of generating a model input such that a model output, which is a prediction result yielded by the model, satisfies the plant model output value;

a database configured to store at least the measured signal limit value set in advance;

an external input interface on figured to fetch measured signals from the plant;

a measured signal database configured to store the values of the fetched measured signals;

a function configured to determine an initial value of the plant model output value by using the measured signal limit value and at least one of an average value, a maximum value, and a minimum value that are calculated from the measured signals stored in the measured signal database;

a function for decreasing or increasing the plant model output value when the model output satisfies the plant model output value, and a plant model value changing device for increasing or decreasing the plant model output value;

wherein the operation signal generating device is configured to generate an operation signal with reference to a database that stores results of learning obtained by the learning device;

wherein the learning device is configured to learn so as to attain the initial value and the increased or decreased plant model output value; and wherein the plant model value changing device is first used to learn the method of generating a model input so as to attain an initial value of the plant model output value, and then the operation signal generation device is configured to generate an operation signal with reference to a database that stores results obtained by learning the method of generating a model input to attain the increased or decreased plant model output value.

6. The plant controlling device according to claim 5, wherein the function configured to determine the initial value of the plant model output value subtracts the average of the measured signals from the maximum value of the measured signals and further subtracts the absolute value of the subtraction result from the measured signal limit value to determine the plant model output value.

7. The plant controlling device according to claim 5, further comprising:

an evaluated value calculating device for calculating an evaluated value used for the learning;

wherein when the plant model output value is attained, the evaluated value calculating device yields a positive or negative evaluated value, and the learning device learns an operation method in which an expected value of the evaluated value is maximized or minimized.

8. The plant controlling device according to claim 5, further comprising:

a user interface for accepting the measured signal limit values.

9. A computer-implemented thermal power plant controlling device for generating an operation signal such that the value of a measured signal satisfies a thermal power generation plant operation value, the measured signal being obtained when the operation signal is given to the plant, the controlling device comprising:

a processor;

a model configured to predict the value of the measured signal obtained when the operation signal is given to the plant;

a learning function configured to learn a method of generating a model input to be given to the model such that a model output, which is a prediction result yielded by the model, satisfies a plant model output value;

a function configured to determine the operation signal to be given to the plant according to a result of the learning;

a database configured to store measured signal limit values set in advance;

an external input interface configured to fetch measured signals from the plant;

a measured signal database configured to store the values of the fetched measured signals; and a function configured to determine an initial value for the plant model output value by using limit values for the measured signals and at least one of an average value, a maximum value, and a minimum value that are calculated from the measured signals stored in the measured signal database;

wherein the external input interface fetches at least one of a carbon monoxide concentration or a nitrogen oxide concentration out of measured signals in a plant;

wherein an environment limit value of at least one of the carbon monoxide concentrations or the nitrogen oxide concentrations is stored in the database configured to store the limit values for the measured signals as the measured signal limit value;

wherein the function configured to determine an initial value of the plant model output value determines an initial value of the plant model output value of the at least one of the carbon monoxide concentrations and the nitrogen oxide concentrations; the learning function learns a method for generating a model input that satisfies the initial value; and wherein the function configured to determine the operation signal is configured to generate the operation signal for at least an opening of an air damper according to a result of the learning.

10. The thermal power plant controlling device according to claim 9, wherein in the controlling device, the function for decreasing or increasing the plant model output value when the model output satisfies the plant model output value determines a modified plant model output value obtained by decreasing or increasing the plant model output value of the nitrogen oxide; the learning function learns a method of generating a model input that satisfies the modified plant model output value.

11. A computer-implemented plant control method for generating, using a processor, an operation signal such that the value of a measured signal satisfies a plant operation value for a plant, the measured signal being obtained when the operation signal is given to the plant, the computer-implemented plant controlling method comprising steps of:

predicting the value of the measured signal obtained when an operation signal is given to the plant by using a model which predicts the value of the measured signal obtained when the operation signal is given to the plant;

determining a plant model output value by using at least one of an average value, a maximum value, and a minimum value of measured signals for the plant as well as the measured signal limit value set in advance;

learning a method of generating a model input to be given to the model such that a model output, which is a prediction result yielded by the model, satisfies the plant model output value; and determining an operation signal to be given to the plant according to a result of the learning.

12. The plant control method according to claim 11,
wherein when the model output satisfies the plant model output value in the learning the method of generating a model input, the plant model output value is decreased or increased such that the decreased or increased plant model output value is attained.

13. The plant control method according to claim 11, wherein the plant model output value is calculated by subtracting the average of the measured signals from the maximum value of the measured signals and further subtracting the absolute value of the subtraction result from the measured signal limit value.

14. The plant control method according to claim 12, wherein the initial value of the plant model output value is calculated by subtracting the average of the measured signals from the maximum value of the measured signals and further subtracting the absolute value of the subtraction result from the measured signal limit value.

15. The plant control method according to claim 11, wherein when the model output satisfies the plant model output value and then a positive or negative evaluated value is calculated to learn the method of generating a model input, an operation method in which an expected value of the evaluated value is maximized or minimized is learned.

16. The plant control method according to claim 12, wherein when the model output satisfies the plant model output value and then a positive or negative evaluated value is calculated to learn the method of generating a model input, an operation method in which an expected value of the evaluated value is maximized or minimized is learned.

17. A thermal power plant control method in which the computer-implemented plant control method according to claim 11 is applied, the control method comprising the steps of:

setting an environment limit value of at least one of carbon monoxide and nitrogen oxide out of the measured signals as a limit value;

determining an initial value of the plant model output value by using at least one of an average value, a maximum value, and a minimum value of the measured signals, for which the limit value is set, and the limit value;

learning a method of generating a model input such that the initial value is attained, and generating an operation signal for at least an opening of an air damper according to a result of the learning.

* * * * *